(12) United States Patent
Hammad

(10) Patent No.: US 10,282,724 B2
(45) Date of Patent: May 7, 2019

(54) SECURITY SYSTEM INCORPORATING MOBILE DEVICE

(75) Inventor: Ayman Hammad, Pleasanton, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 469 days.

(21) Appl. No.: 13/413,484

(22) Filed: Mar. 6, 2012

(65) Prior Publication Data

US 2013/0238499 A1    Sep. 12, 2013

(51) Int. Cl.
*G06Q 20/32* (2012.01)
*G06Q 20/40* (2012.01)

(52) U.S. Cl.
CPC ....... *G06Q 20/3227* (2013.01); *G06Q 20/401* (2013.01); *G06Q 20/4018* (2013.01)

(58) Field of Classification Search
USPC ....................................... 705/64, 65, 67, 75
See application file for complete search history.

(56) References Cited

U.S. PATENT DOCUMENTS

| | | | |
|---|---|---|---|
| 5,336,870 A | 8/1994 | Hughes et al. |
| 5,365,586 A | 11/1994 | Indeck et al. |
| 5,450,537 A | 9/1995 | Hirai et al. |
| 5,550,561 A | 8/1996 | Ziarno |
| 5,613,012 A | 3/1997 | Hoffman |
| 5,625,669 A | 4/1997 | McGregor et al. |
| 5,640,577 A | 6/1997 | Scharmer |
| 5,696,824 A | 12/1997 | Walsh |
| 5,729,591 A | 3/1998 | Bailey |
| 5,742,845 A | 4/1998 | Wagner |

(Continued)

FOREIGN PATENT DOCUMENTS

| | | |
|---|---|---|
| CN | 101110113 | 1/2008 |
| CN | 101211436 | 7/2008 |

(Continued)

OTHER PUBLICATIONS

International Search Report dated May 27, 2011 from International Patent Application No. PCT/US2010/055500.

(Continued)

*Primary Examiner* — Tsan-Yu J Huang
(74) *Attorney, Agent, or Firm* — Kilpatrick, Townsend & Stockton LLP

(57) ABSTRACT

In some embodiments, a first server computer may be provided. The first server computer may comprise a processor and a computer readable medium coupled to the processor. The computer readable medium may include code executable by the processor for implementing a method. The method may include the step of electronically receiving an authorization request message that includes a first device verification value from a merchant for a first transaction, where the first device verification value may have been received by the merchant from a mobile device based on an interaction between the mobile device and an access device. In some embodiments, the mobile device may have received the first verification value based on a first request. The method may further include the step of determining by a data processor if the first device verification value corresponds to a stored device verification value.

13 Claims, 9 Drawing Sheets

(56) References Cited

U.S. PATENT DOCUMENTS

| | | |
|---|---|---|
| 5,781,438 A | 7/1998 | Lee |
| 5,794,259 A | 8/1998 | Kikinis |
| 5,883,810 A | 3/1999 | Franklin |
| 5,953,710 A | 9/1999 | Fleming |
| 5,956,699 A | 9/1999 | Wong |
| 5,974,430 A | 10/1999 | Mutschler, III et al. |
| 6,000,832 A | 12/1999 | Franklin |
| 6,014,635 A | 1/2000 | Harris |
| 6,032,859 A | 3/2000 | Muehlberger et al. |
| 6,044,349 A | 3/2000 | Tolopka et al. |
| 6,044,360 A | 3/2000 | Picciallo |
| 6,055,592 A | 4/2000 | Smith |
| 6,067,621 A | 5/2000 | Yu et al. |
| 6,163,771 A | 12/2000 | Walker |
| 6,227,447 B1 | 5/2001 | Campisano |
| 6,234,389 B1 | 5/2001 | Valliani et al. |
| 6,236,981 B1 | 5/2001 | Hill |
| 6,253,328 B1 | 6/2001 | Smith, Jr. |
| 6,267,292 B1 | 7/2001 | Walker |
| 6,299,062 B1 | 10/2001 | Hwang |
| 6,327,578 B1 | 12/2001 | Linehan |
| 6,341,724 B2 | 1/2002 | Campisano |
| 6,354,496 B1 | 3/2002 | Murphy et al. |
| 6,385,596 B1 | 5/2002 | Wiser et al. |
| 6,421,729 B1 | 7/2002 | Paltenghe et al. |
| 6,422,462 B1 | 7/2002 | Cohen |
| 6,425,523 B1 | 7/2002 | Shem Ur |
| 6,449,347 B1 | 9/2002 | Ple et al. |
| 6,490,601 B1 | 12/2002 | Markus et al. |
| 6,499,042 B1 | 12/2002 | Markus |
| 6,560,709 B1 | 5/2003 | Galovich |
| 6,571,339 B1 | 5/2003 | Danneels et al. |
| 6,592,044 B1 | 7/2003 | Wong |
| 6,636,833 B1 | 10/2003 | Flitcroft |
| 6,685,095 B2 | 2/2004 | Roustaei et al. |
| 6,738,749 B1 | 5/2004 | Chasko |
| 6,748,367 B1 | 6/2004 | Lee |
| 6,805,287 B2 | 10/2004 | Bishop |
| 6,850,996 B2 | 2/2005 | Wagner |
| 6,873,974 B1 | 3/2005 | Schutzer |
| 6,879,965 B2 | 4/2005 | Fung |
| 6,891,953 B1 | 5/2005 | DeMello et al. |
| 6,901,387 B2 | 5/2005 | Wells |
| 6,907,476 B2 | 6/2005 | Wagner |
| 6,931,382 B2 | 8/2005 | Laage |
| 6,938,019 B1 | 8/2005 | Uzo |
| 6,941,285 B2 | 9/2005 | Sarcanin |
| 6,947,908 B1 | 9/2005 | Slater |
| 6,980,670 B1 | 12/2005 | Hoffman |
| 6,983,882 B2 | 1/2006 | Cassone |
| 6,990,470 B2 | 1/2006 | Hogan |
| 6,991,157 B2 | 1/2006 | Bishop |
| 6,993,658 B1 | 1/2006 | Engberg et al. |
| 7,007,840 B2 | 3/2006 | Davis |
| 7,051,929 B2 | 5/2006 | Li |
| 7,062,706 B2 | 6/2006 | Maxwell et al. |
| 7,069,249 B2 | 6/2006 | Stolfo |
| 7,080,048 B1 | 7/2006 | Sines et al. |
| 7,103,576 B2 | 9/2006 | Mann, III |
| 7,111,324 B2 | 9/2006 | Elteto et al. |
| 7,113,930 B2 | 9/2006 | Eccles |
| 7,136,835 B1 | 11/2006 | Flitcroft |
| 7,159,180 B2 | 1/2007 | Ward |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,210,169 B2 | 4/2007 | Smith et al. |
| 7,216,292 B1 | 5/2007 | Snapper et al. |
| 7,231,045 B1 | 6/2007 | Parrott |
| 7,254,560 B2 | 8/2007 | Singhal |
| 7,254,569 B2 | 8/2007 | Goodman et al. |
| 7,257,581 B1 | 8/2007 | Steele et al. |
| 7,264,154 B2 | 9/2007 | Harris |
| 7,275,263 B2 | 9/2007 | Bajikar et al. |
| 7,275,685 B2 | 10/2007 | Gray et al. |
| 7,287,692 B1 | 10/2007 | Patel |
| 7,292,999 B2 | 11/2007 | Hobson |
| 7,334,184 B1 | 2/2008 | Simons |
| 7,343,351 B1 | 3/2008 | Bishop et al. |
| 7,346,587 B2 | 3/2008 | Goldstein et al. |
| 7,347,361 B2 | 3/2008 | Lovett |
| 7,350,139 B1 | 3/2008 | Simons |
| 7,350,230 B2 | 3/2008 | Forrest |
| 7,353,382 B2 | 4/2008 | Labrou |
| 7,356,706 B2 | 4/2008 | Scheurich |
| 7,366,703 B2 | 4/2008 | Gray et al. |
| 7,379,919 B2 | 5/2008 | Hogan |
| RE40,444 E | 7/2008 | Linehan |
| 7,412,420 B2 | 8/2008 | Holdsworth |
| 7,412,422 B2 | 8/2008 | Shiloh |
| 7,415,443 B2 | 8/2008 | Hobson |
| 7,427,033 B1 | 9/2008 | Roskind |
| 7,430,540 B1 | 9/2008 | Asani |
| 7,431,202 B1 | 10/2008 | Meador et al. |
| 7,437,575 B2 | 10/2008 | Dennis et al. |
| 7,437,757 B2 | 10/2008 | Holdsworth |
| 7,444,676 B1 | 10/2008 | Asghari-Kamrani |
| 7,469,151 B2 | 12/2008 | Khan |
| 7,483,845 B2 | 1/2009 | Vetelainen |
| 7,512,975 B2 | 3/2009 | Aissi |
| 7,533,063 B2 | 5/2009 | Kianian |
| 7,533,828 B2 | 5/2009 | Ong |
| 7,543,738 B1 | 6/2009 | Saunders et al. |
| 7,548,889 B2 | 6/2009 | Bhambri |
| 7,567,934 B2 | 7/2009 | Flitcroft |
| 7,567,936 B1 | 7/2009 | Peckover |
| 7,568,631 B2 | 8/2009 | Gibbs et al. |
| 7,571,139 B1 | 8/2009 | Giordano et al. |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,599,863 B2 | 10/2009 | Sines et al. |
| 7,606,560 B2 * | 10/2009 | Labrou ............... G06Q 20/18 455/410 |
| 7,627,531 B2 | 12/2009 | Breck |
| 7,627,895 B2 | 12/2009 | Gifford |
| 7,650,314 B1 | 1/2010 | Saunders |
| 7,660,779 B2 | 2/2010 | Goodman et al. |
| 7,664,699 B1 | 2/2010 | Powell |
| 7,685,037 B2 | 3/2010 | Reiners |
| 7,694,130 B1 | 4/2010 | Martinez |
| 7,702,578 B2 | 4/2010 | Fung |
| 7,707,120 B2 | 4/2010 | Dominguez |
| 7,712,655 B2 | 5/2010 | Wong |
| 7,716,596 B2 | 5/2010 | Cao et al. |
| 7,734,527 B2 | 6/2010 | Uzo |
| 7,753,265 B2 | 7/2010 | Harris |
| 7,761,374 B2 | 7/2010 | Sahota et al. |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,014 B2 | 12/2010 | Erikson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,560 B2 | 2/2011 | Hammad |
| 7,891,563 B2 | 2/2011 | Oder, II |
| 7,896,238 B2 | 3/2011 | Fein |

(56) References Cited

U.S. PATENT DOCUMENTS

| | | |
|---|---|---|
| 7,908,216 B1 | 3/2011 | Davis et al. |
| 7,922,082 B2 | 4/2011 | Muscato |
| 7,931,195 B2 | 4/2011 | Mullen |
| 7,938,318 B2 | 5/2011 | Fein |
| 7,954,705 B2 | 6/2011 | Mullen |
| 7,959,076 B1 | 6/2011 | Hopkins, III |
| 7,966,257 B2 | 6/2011 | DiGioacchino |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B1 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,313,022 B2 | 11/2012 | Hammad et al. |
| 8,326,759 B2 | 12/2012 | Hammad |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,226 B2 | 5/2013 | Hammad |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,533,860 B1 | 9/2013 | Grecia |
| 8,534,564 B2 | 9/2013 | Hammad |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,602,293 B2 | 12/2013 | Hammad |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,827,154 B2 | 9/2014 | Hammad |
| 8,838,982 B2 | 9/2014 | Carlson et al. |
| 8,856,539 B2 | 10/2014 | Weiss |
| 8,887,308 B2 | 11/2014 | Grecia |
| 8,893,967 B2 | 11/2014 | Hammad |
| 9,038,886 B2 | 5/2015 | Hammad |
| 9,065,643 B2 | 6/2015 | Hurry et al. |
| 9,070,129 B2 | 6/2015 | Sheets et al. |
| 9,100,826 B2 | 8/2015 | Weiss |
| 9,105,027 B2 | 8/2015 | Hammad et al. |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,317,848 B2 | 4/2016 | Hammad |
| 9,372,971 B2 | 6/2016 | Hammad |
| 9,424,413 B2 | 8/2016 | Hammad |
| 9,530,137 B2 | 12/2016 | Weiss |
| 2001/0029485 A1 | 10/2001 | Brody |
| 2001/0032182 A1 | 10/2001 | Kumar et al. |
| 2001/0032192 A1 | 10/2001 | Putta et al. |
| 2001/0034720 A1 | 10/2001 | Armes |
| 2001/0042785 A1 | 11/2001 | Walker et al. |
| 2001/0051924 A1 | 12/2001 | Uberti |
| 2001/0054003 A1 | 12/2001 | Chien |
| 2001/0054148 A1 | 12/2001 | Hoornaert et al. |
| 2002/0007320 A1 | 1/2002 | Hogan |
| 2002/0016749 A1 | 2/2002 | Borecki |
| 2002/0023054 A1 | 2/2002 | Gillespie |
| 2002/0029193 A1 | 3/2002 | Ranjan |
| 2002/0035539 A1 | 3/2002 | O'connell |
| 2002/0035548 A1 | 3/2002 | Hogan |
| 2002/0038286 A1 | 3/2002 | Koren et al. |
| 2002/0044689 A1 | 4/2002 | Roustaei et al. |
| 2002/0059146 A1 | 5/2002 | Keech |
| 2002/0073045 A1 | 6/2002 | Rubin |
| 2002/0077837 A1 | 6/2002 | Krueger et al. |
| 2002/0091877 A1 | 7/2002 | Karidis |
| 2002/0107791 A1 | 8/2002 | Nobrega et al. |
| 2002/0116341 A1 | 8/2002 | Hogan |
| 2002/0120584 A1 | 8/2002 | Hogan et al. |
| 2002/0128977 A1 | 9/2002 | Nambiar et al. |
| 2002/0133467 A1 | 9/2002 | Hobson |
| 2002/0147913 A1 | 10/2002 | Lun Yip |
| 2002/0170960 A1 | 11/2002 | Ehrensvard et al. |
| 2003/0028481 A1 | 2/2003 | Flitcroft |
| 2003/0038835 A1 | 2/2003 | DeFelice |
| 2003/0057219 A1 | 3/2003 | Risolia |
| 2003/0097561 A1 | 5/2003 | Wheeler et al. |
| 2003/0115142 A1 | 6/2003 | Brickell et al. |
| 2003/0126094 A1 | 7/2003 | Fisher et al. |
| 2003/0130955 A1 | 7/2003 | Hawthorne |
| 2003/0142855 A1 | 7/2003 | Kuo et al. |
| 2003/0191709 A1 | 10/2003 | Elston |
| 2003/0191945 A1 | 10/2003 | Keech |
| 2003/0200184 A1 | 10/2003 | Dominguez et al. |
| 2003/0212642 A1 | 11/2003 | Weller et al. |
| 2004/0010462 A1 | 1/2004 | Moon |
| 2004/0039651 A1 | 2/2004 | Grunzig |
| 2004/0050928 A1 | 3/2004 | Bishop |
| 2004/0058705 A1 | 3/2004 | Morgan et al. |
| 2004/0059682 A1 | 3/2004 | Hasumi |

(56) References Cited

U.S. PATENT DOCUMENTS

| | | |
|---|---|---|
| 2004/0093281 A1 | 5/2004 | Silverstein |
| 2004/0104268 A1 | 6/2004 | Bailey |
| 2004/0127256 A1 | 7/2004 | Goldthwaite et al. |
| 2004/0139008 A1 | 7/2004 | Mascavage |
| 2004/0143532 A1 | 7/2004 | Lee |
| 2004/0158532 A1 | 8/2004 | Breck |
| 2004/0188519 A1 | 9/2004 | Cassone |
| 2004/0210449 A1 | 10/2004 | Breck |
| 2004/0210498 A1 | 10/2004 | Freund |
| 2004/0210821 A1 | 10/2004 | Kasser |
| 2004/0226999 A1 | 11/2004 | Ruat et al. |
| 2004/0232225 A1 | 11/2004 | Bishop |
| 2004/0248554 A1 | 12/2004 | Khan et al. |
| 2004/0254890 A1 | 12/2004 | Sancho et al. |
| 2004/0260646 A1 | 12/2004 | Berardi |
| 2004/0267672 A1 | 12/2004 | Gray et al. |
| 2005/0036611 A1 | 2/2005 | Seaton, Jr. et al. |
| 2005/0037735 A1 | 2/2005 | Coutts |
| 2005/0043997 A1 | 2/2005 | Sahota |
| 2005/0065875 A1 | 3/2005 | Beard |
| 2005/0077349 A1 | 4/2005 | Bonalle et al. |
| 2005/0080730 A1 | 4/2005 | Sorrentino |
| 2005/0108178 A1 | 5/2005 | York |
| 2005/0108569 A1 | 5/2005 | Bantz et al. |
| 2005/0109838 A1 | 5/2005 | Linlor |
| 2005/0127164 A1 | 6/2005 | Wankmueller |
| 2005/0187873 A1* | 8/2005 | Labrou ............... G06Q 20/02 705/40 |
| 2005/0199709 A1 | 9/2005 | Linlor |
| 2005/0246293 A1 | 11/2005 | Ong |
| 2005/0250538 A1* | 11/2005 | Narasimhan et al. ........ 455/558 |
| 2005/0269401 A1 | 12/2005 | Spitzer |
| 2005/0269402 A1 | 12/2005 | Spitzer |
| 2005/0278461 A1 | 12/2005 | Ohta |
| 2006/0016879 A1 | 1/2006 | Kean |
| 2006/0026098 A1 | 2/2006 | Peckover et al. |
| 2006/0131390 A1 | 6/2006 | Kim |
| 2006/0142058 A1 | 6/2006 | Elias et al. |
| 2006/0168653 A1 | 7/2006 | Contrera |
| 2006/0175396 A1 | 8/2006 | Call et al. |
| 2006/0235795 A1 | 10/2006 | Johnson |
| 2006/0237528 A1 | 10/2006 | Bishop |
| 2006/0253389 A1 | 11/2006 | Hagale |
| 2006/0278704 A1 | 12/2006 | Saunders |
| 2006/0294023 A1 | 12/2006 | Lu |
| 2006/0294095 A1 | 12/2006 | Berk et al. |
| 2007/0005685 A1 | 1/2007 | Chau |
| 2007/0022058 A1* | 1/2007 | Labrou ............... G06Q 20/32 705/67 |
| 2007/0083444 A1 | 4/2007 | Matthews et al. |
| 2007/0107044 A1 | 5/2007 | Yuen |
| 2007/0114274 A1 | 5/2007 | Gibbs et al. |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0178883 A1 | 8/2007 | Nandagopal |
| 2007/0179885 A1 | 8/2007 | Bird |
| 2007/0185820 A1 | 8/2007 | Talker |
| 2007/0185821 A1 | 8/2007 | Wells et al. |
| 2007/0208671 A1 | 9/2007 | Brown |
| 2007/0228148 A1 | 10/2007 | Rable |
| 2007/0245414 A1 | 10/2007 | Chan |
| 2007/0272743 A1 | 11/2007 | Christie et al. |
| 2007/0284433 A1 | 12/2007 | Domenica et al. |
| 2007/0284443 A1 | 12/2007 | Anson et al. |
| 2007/0288377 A1 | 12/2007 | Shaked |
| 2007/0290034 A1 | 12/2007 | Routhenstein |
| 2007/0291995 A1 | 12/2007 | Rivera |
| 2008/0001744 A1 | 1/2008 | Batra et al. |
| 2008/0014867 A1 | 1/2008 | Finn |
| 2008/0015988 A1 | 1/2008 | Brown |
| 2008/0029607 A1 | 2/2008 | Mullen |
| 2008/0034221 A1 | 2/2008 | Hammad |
| 2008/0035738 A1 | 2/2008 | Mullen |
| 2008/0040276 A1 | 2/2008 | Hammad |
| 2008/0040285 A1 | 2/2008 | Wankmueller |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0071681 A1 | 3/2008 | Khalid |
| 2008/0097925 A1 | 4/2008 | King |
| 2008/0103984 A1* | 5/2008 | Choe ............... G06Q 20/20 705/76 |
| 2008/0110983 A1 | 5/2008 | Ashfield |
| 2008/0120214 A1 | 5/2008 | Steele et al. |
| 2008/0142582 A1 | 6/2008 | Corioni |
| 2008/0154770 A1 | 6/2008 | Rutherford et al. |
| 2008/0162312 A1 | 7/2008 | Sklovsky et al. |
| 2008/0177796 A1 | 7/2008 | Eldering |
| 2008/0201264 A1 | 8/2008 | Brown |
| 2008/0201265 A1 | 8/2008 | Hewton |
| 2008/0203152 A1 | 8/2008 | Hammad |
| 2008/0228646 A1 | 9/2008 | Myers |
| 2008/0228653 A1 | 9/2008 | Holdsworth |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0275779 A1 | 11/2008 | Lakshminarayanan |
| 2008/0283591 A1 | 11/2008 | Oder, II |
| 2008/0289022 A1 | 11/2008 | Chiu |
| 2008/0302869 A1 | 12/2008 | Mullen |
| 2008/0302876 A1 | 12/2008 | Mullen |
| 2008/0313264 A1 | 12/2008 | Pestoni |
| 2008/0319869 A1 | 12/2008 | Carlson et al. |
| 2008/0319905 A1 | 12/2008 | Carlson |
| 2009/0006262 A1 | 1/2009 | Brown |
| 2009/0006646 A1 | 1/2009 | Duarte |
| 2009/0010488 A1 | 1/2009 | Matsuoka |
| 2009/0018959 A1 | 1/2009 | Doran et al. |
| 2009/0037333 A1 | 2/2009 | Flitcroft |
| 2009/0037388 A1 | 2/2009 | Cooper et al. |
| 2009/0043702 A1 | 2/2009 | Bennett |
| 2009/0044268 A1 | 2/2009 | Tak |
| 2009/0048971 A1 | 2/2009 | Hathaway |
| 2009/0104888 A1 | 4/2009 | Cox |
| 2009/0106112 A1 | 4/2009 | Dalmia |
| 2009/0106138 A1 | 4/2009 | Smith |
| 2009/0106160 A1 | 4/2009 | Skowronek |
| 2009/0125446 A1 | 5/2009 | Saunders et al. |
| 2009/0132413 A1 | 5/2009 | Engelbrecht |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0160617 A1 | 6/2009 | Mullen |
| 2009/0173782 A1 | 7/2009 | Muscato |
| 2009/0200371 A1 | 8/2009 | Kean |
| 2009/0219430 A1 | 9/2009 | Okamoto et al. |
| 2009/0248583 A1 | 10/2009 | Chhabra |
| 2009/0249462 A1 | 10/2009 | Chhabra |
| 2009/0254986 A1 | 10/2009 | Harris et al. |
| 2009/0255987 A1 | 10/2009 | Olivares |
| 2009/0265260 A1 | 10/2009 | Aabye et al. |
| 2009/0276347 A1 | 11/2009 | Kargman |
| 2009/0281948 A1 | 11/2009 | Carlson |
| 2009/0289110 A1 | 11/2009 | Regen et al. |
| 2009/0292631 A1 | 11/2009 | Wells et al. |
| 2009/0294527 A1 | 12/2009 | Brabson |
| 2009/0307139 A1 | 12/2009 | Mardikar |
| 2009/0307140 A1* | 12/2009 | Mardikar ............ G06Q 20/1085 705/71 |
| 2009/0307493 A1 | 12/2009 | Smith |
| 2009/0308921 A1 | 12/2009 | Mullen |
| 2009/0313168 A1 | 12/2009 | Manessis |
| 2009/0319430 A1 | 12/2009 | Faith et al. |
| 2009/0319431 A1 | 12/2009 | Aiello et al. |
| 2009/0319784 A1 | 12/2009 | Faith et al. |
| 2009/0327131 A1 | 12/2009 | Beenau |
| 2010/0008535 A1 | 1/2010 | Abulafia |

(56) References Cited

U.S. PATENT DOCUMENTS

| | | |
|---|---|---|
| 2010/0023400 A1 | 1/2010 | DeWitt |
| 2010/0088237 A1 | 4/2010 | Wankmueller |
| 2010/0094755 A1 | 4/2010 | Kloster |
| 2010/0100481 A1 | 4/2010 | Doran et al. |
| 2010/0106644 A1 | 4/2010 | Annan |
| 2010/0114776 A1 | 5/2010 | Weller et al. |
| 2010/0120408 A1 | 5/2010 | Beenau |
| 2010/0125516 A1 | 5/2010 | Wankmueller et al. |
| 2010/0133334 A1 | 6/2010 | Vadhri |
| 2010/0133335 A1* | 6/2010 | Maguid ............... G06Q 20/20 235/380 |
| 2010/0138347 A1 | 6/2010 | Chen |
| 2010/0145860 A1 | 6/2010 | Pelegero |
| 2010/0161433 A1 | 6/2010 | White |
| 2010/0174556 A1 | 7/2010 | Wilkins et al. |
| 2010/0176935 A1 | 7/2010 | Phillips |
| 2010/0185545 A1 | 7/2010 | Royyuru |
| 2010/0186073 A1 | 7/2010 | Curtis |
| 2010/0191613 A1 | 7/2010 | Raleigh |
| 2010/0211505 A1 | 8/2010 | Saunders |
| 2010/0223184 A1 | 9/2010 | Perlman |
| 2010/0223186 A1 | 9/2010 | Hogan |
| 2010/0228668 A1 | 9/2010 | Hogan |
| 2010/0235284 A1 | 9/2010 | Moore |
| 2010/0257102 A1 | 10/2010 | Perlman |
| 2010/0258620 A1 | 10/2010 | Torreyson |
| 2010/0260388 A1* | 10/2010 | Garrett ............... G06Q 20/22 382/124 |
| 2010/0274692 A1 | 10/2010 | Hammad |
| 2010/0274721 A1 | 10/2010 | Hammad |
| 2010/0291904 A1 | 11/2010 | Musfeldt |
| 2010/0293189 A1 | 11/2010 | Hammad |
| 2010/0293381 A1* | 11/2010 | Hammad ............... G06F 21/31 713/172 |
| 2010/0293382 A1 | 11/2010 | Hammad |
| 2010/0299267 A1 | 11/2010 | Faith et al. |
| 2010/0306076 A1 | 12/2010 | Taveau |
| 2010/0318801 A1 | 12/2010 | Roberge et al. |
| 2010/0325041 A1 | 12/2010 | Berardi |
| 2010/0327054 A1 | 12/2010 | Hammad |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0108623 A1 | 5/2011 | Hammad |
| 2011/0125597 A1 | 5/2011 | Oder, II |
| 2011/0140841 A1 | 6/2011 | Bona et al. |
| 2011/0153437 A1* | 6/2011 | Archer ............... G06Q 20/10 705/17 |
| 2011/0153498 A1 | 6/2011 | Makhotin et al. |
| 2011/0154466 A1 | 6/2011 | Harper |
| 2011/0154467 A1 | 6/2011 | Bomar et al. |
| 2011/0161233 A1 | 6/2011 | Tieken |
| 2011/0178926 A1 | 7/2011 | Lindelsee et al. |
| 2011/0184867 A1 | 7/2011 | Varadarajan |
| 2011/0191244 A1 | 8/2011 | Dai |
| 2011/0208658 A1 | 8/2011 | Makhotin |
| 2011/0238511 A1 | 9/2011 | Park |
| 2011/0238573 A1 | 9/2011 | Varadarajan |
| 2011/0238579 A1 | 9/2011 | Coppinger |
| 2011/0240740 A1 | 10/2011 | Li et al. |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276418 A1 | 11/2011 | Velani |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2011/0307710 A1 | 12/2011 | McGuire et al. |
| 2012/0018506 A1 | 1/2012 | Hammad et al. |
| 2012/0018511 A1 | 1/2012 | Hammad |
| 2012/0024946 A1 | 2/2012 | Tullis et al. |
| 2012/0028609 A1* | 2/2012 | Hruska ............... G06Q 20/3674 455/411 |
| 2012/0030047 A1 | 2/2012 | Fuentes et al. |
| 2012/0031969 A1 | 2/2012 | Hammad |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0116976 A1 | 5/2012 | Hammad et al. |
| 2012/0123882 A1 | 5/2012 | Carlson |
| 2012/0123940 A1 | 5/2012 | Killian |
| 2012/0129514 A1 | 5/2012 | Beenau |
| 2012/0143754 A1* | 6/2012 | Patel ............... G06Q 20/341 705/41 |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | McCullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |

(56) References Cited

U.S. PATENT DOCUMENTS

| | | |
|---|---|---|
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0238499 A1* | 9/2013 | Hammad .......... G06Q 20/3227 705/44 |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar et al. |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0061302 A1 | 3/2014 | Hammad |
| 2014/0068706 A1 | 3/2014 | Aissi |
| 2014/0074637 A1 | 3/2014 | Hammad |
| 2014/0108172 A1 | 4/2014 | Weber et al. |
| 2014/0110477 A1 | 4/2014 | Hammad |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0134537 A1 | 5/2015 | Hammad |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0317625 A1 | 11/2015 | Hammad |
| 2015/0319158 A1 | 11/2015 | Kumnick |
| 2015/0332262 A1 | 11/2015 | Lingappa |
| 2015/0356560 A1 | 12/2015 | Shastry et al. |
| 2015/0379515 A1 | 12/2015 | Hammad et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0218875 A1 | 7/2016 | Le Saint et al. |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0275501 A1 | 9/2016 | Hammad |
| 2016/0371688 A1 | 12/2016 | Hammad |
| 2016/0379217 A1 | 12/2016 | Hammad |
| 2017/0300884 A1 | 10/2017 | Hammad |
| 2018/0005238 A1 | 1/2018 | Hammad |

FOREIGN PATENT DOCUMENTS

| | | |
|---|---|---|
| CN | 101485128 | 7/2009 |
| CN | 101512957 | 8/2009 |
| CN | 101582121 | 11/2009 |

(56) References Cited

FOREIGN PATENT DOCUMENTS

| | | |
|---|---|---|
| CN | 103270524 | 8/2013 |
| EA | 11495 | 4/2009 |
| EP | 1168265 A1 | 1/2002 |
| EP | 1840814 A1 | 10/2007 |
| EP | 2098985 S2 | 9/2009 |
| EP | 2156397 A1 | 2/2010 |
| GB | 2459850 | 11/2009 |
| JP | 2008210370 | 9/2008 |
| KR | 1020000054496 | 9/2000 |
| KR | 1020030020189 | 3/2003 |
| KR | 10-2005-0019674 A | 3/2005 |
| KR | 1020060022304 | 3/2006 |
| KR | 10-2006-0096821 A | 9/2006 |
| KR | 1020060111200 | 10/2006 |
| KR | 1020070100076 | 10/2007 |
| KR | 1020080026802 | 3/2008 |
| KR | 10-2008-0039330 | 5/2008 |
| KR | 10-2008-0051198 A | 6/2008 |
| KR | 1020090021388 | 3/2009 |
| KR | 10-2009-0044619 | 5/2009 |
| KR | 1020100110642 | 10/2010 |
| RU | 2252451 C2 | 5/2005 |
| RU | 2331110 | 8/2008 |
| RU | 2011148229 | 6/2013 |
| WO | 01/16900 A2 | 3/2001 |
| WO | 0117296 | 3/2001 |
| WO | 0184509 | 11/2001 |
| WO | 0188785 | 11/2001 |
| WO | 02/01520 | 1/2002 |
| WO | 2001035304 A9 | 5/2002 |
| WO | 2002059727 | 8/2002 |
| WO | 03047208 | 6/2003 |
| WO | 03073389 | 9/2003 |
| WO | 03075192 | 9/2003 |
| WO | 2004042536 A2 | 5/2004 |
| WO | 2005001618 | 1/2005 |
| WO | 2005001635 | 1/2005 |
| WO | 2005073931 | 8/2005 |
| WO | 2005109360 A1 | 11/2005 |
| WO | 2006099294 | 9/2006 |
| WO | 2006113834 A2 | 10/2006 |
| WO | 2008014554 A1 | 2/2008 |
| WO | 2009003030 | 12/2008 |
| WO | 2009025605 A2 | 2/2009 |
| WO | 2009032523 A1 | 3/2009 |
| WO | 09/052634 | 4/2009 |
| WO | 2010078522 A1 | 7/2010 |
| WO | 2010129357 | 11/2010 |
| WO | 2011057007 | 5/2011 |
| WO | 2011031988 | 7/2011 |
| WO | 2012054763 | 4/2012 |
| WO | 2012058309 | 5/2012 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

The International Search Report of the International Searching Authority for Application No. PCT/US2010/048455, dated May 30, 2011, 4 pages.
The International Written Opinion of the International Searching Authority for Application No. PCT/US2010/048455, dated May 30, 2011, 5 pages.
"2.4.2 How VISA Card Verification Values are Used," 2.4.2 "z/OS V1R3.0 ICSF Application Programmer's Guide" IBM Library Server, 1 page, © Copyright IBM Corp. 1997, 2002, downloaded Mar. 27, 2012 from URL: http://publibz.boulder.ibm.com/cgi-bin/bookmgr_OS390/BOOKS/CSFB4Z20/2.4.2?SHEL.

Reisinger, D., "PayPal offers SMS security key for mobile users," Nov. 24, 2008, pp. 1-3, © Copyright CBS Interactive, downloaded Mar. 27, 2012 from URL: http://news.cnet.com/8301-17939_1209-10106410-2.html.
The International Search Report for Application No. PCT/US2010/032825, dated Dec. 1, 2010, 3 pages.
The International Written Opinion for Application No. PCT/US2010/032825, dated Dec. 1, 2010, 6 pages.
U.S. Appl. No. 12/778,446, filed Oct. 29, 2009, Perlman, 48 pages.
U.S. Appl. No. 12/778,459, filed Oct. 29, 2009, Perlman, 48 pages.
U.S. Appl. No. 12/778,485, filed Oct. 29, 2009, Perlman et al., 49 pages.
U.S. Appl. No. 12/939,963, filed Nov. 4, 2010, Hammad et al., 105 pages.
U.S. Appl. No. 61/061,936, filed Jun. 16, 2008, Manessis, 12 pages.
U.S. Appl. No. 61/112,124, filed Nov. 6, 2008, Weller et al., 61 pages.
U.S. Appl. No. 61/178,636, filed May 15, 2009, Hammad, 58 pages.
U.S. Appl. No. 61/256,095, filed Oct. 29, 2009, Perlman, 40 pages.
U.S. Appl. No. 61/256,136, filed Oct. 29, 2009, Perlman, 64 pages.
U.S. Appl. No. 61/256,141, filed Oct. 29, 2009, Perlman, 38 pages.
U.S. Appl. No. 61/256,143, filed Oct. 29, 2009, Perlman et al., 29 pages.
U.S. Appl. No. 61/256,147, filed Oct. 29, 2009, Perlman, 41 pages.
U.S. Appl. No. 61/258,194, filed Nov. 4, 2009, Hammad, 147 pages.
European Examination Report dated Nov. 11, 2016 in EP 10772579.8, 8 pages.
Security Concerns Usher in Disposable Credit Cards, Credit Card News, Sep. 15, 2000, 1 page.
Petition for Inter Partes Review of U.S. Pat. No. 8,533,860 Challenging Claims 1-30 Under 35 U.S.C. § 312 and 37 C.F.R. § 42.104, Before the USPTO Patent Trial and Appeal Board, IPR 2016-00600, Feb. 17, 2016, 65 pages.
U.S. Appl. No. 14/600,523, Titled—Secure Ayment Processing Using Authorization Request filed Jan. 20, 2015.
U.S. Appl. No. 15/008,388, Titled—Methods for Secure Credential Provisioning filed Jan. 27, 2016.
U.S. Appl. No. 15/011,366, Titled—Token Check Offline filed Jan. 29, 2016.
U.S. Appl. No. 15/019,157, Titled—Token Processing Utilizing Multiple Authorizations filed Feb. 9, 2016.
U.S. Appl. No. 15/041,495, Titled—Peer Forward Authorization of Digital Requests filed Feb. 11, 2016.
U.S. Appl. No. 61/738,832, Titled—Management of Sensitive Data filed Dec. 18, 2012.
U.S. Appl. No. 61/751,763, Titled—Payments Bridge filed Jan. 11, 2013.
U.S. Appl. No. 61/879,362, Titled—Systems and Methods for Managing Mobile Cardholder Verification Methods filed Sep. 18, 2013.
U.S. Appl. No. 61/892,407, Titled—Issuer Over-The-Air Update Method and System filed Oct. 17, 2013.
U.S. Appl. No. 61/894,749, Titled—Methods and Systems for Authentication and Issuance of Tokens in a Secure Environment filed Oct. 23, 2013.
U.S. Appl. No. 61/926,236, Titled—Methods and Systems for Provisioning Mobile Devices With Payment Credentials and Payment Token Identifiers filed Jan. 10, 2014.
U.S. Appl. No. 62/000,288, Titled—Payment System Canonical Address Format filed May 19, 2014.
U.S. Appl. No. 62/003,717, Titled—Mobile Merchant Application filed May 28, 2014.
U.S. Appl. No. 62/024,426, Titled—Secure Transactions Using Mobile Devices filed Jul. 14, 2014.
U.S. Appl. No. 62/037,033, Titled—Sharing Payment Token filed Aug. 13, 2014.
U.S. Appl. No. 62/038,174, Titled—Customized Payment Gateway filed Aug. 15, 2014.
U.S. Appl. No. 62/042,050, Titled—Payment Device Authentication and Authorization System filed Aug. 26, 2014.
U.S. Appl. No. 62/053,736, Titled—Completing Transactions Without a User Payment Device filed Sep. 22, 2014.

(56) References Cited

OTHER PUBLICATIONS

U.S. Appl. No. 62/054,346, Titled—Mirrored Token Vault filed Sep. 23, 2014.
U.S. Appl. No. 62/103,522, Titled—Methods and Systems for Wallet Provider Provisioning filed Jan. 14, 2015.
U.S. Appl. No. 62/108,403, Titled—Wearables With NFC HCE filed Jan. 27, 2015.
U.S. Appl. No. 62/117,291, Titled—Token and Cryptogram Using Transaction Specific Information filed Feb. 17, 2015.
U.S. Appl. No. 62/128,709, Titled-Tokenizing Transaction Amounts filed Mar. 5, 2015.
Gillick, Global Platform, Trusted Execution Environment (TEE) Guide, https://web.archive.org/web/20120212221931/http://www.globalplatform.org/mediaguidetee.asp, Feb. 12, 2012.
Notice of Allowance dated Mar. 1, 2016 in U.S. Appl. No. 13/411,400, 11 pages.
Office Action dated Aug. 28, 2015 in U.S. Appl. No. 13/411,400, 19 pages.
Notice of Allowance dated Jun. 15, 2016 in U.S. Appl. No. 14/511,034, 7 pages.
Office Action dated Aug. 25, 2016 in U.S. Appl. No. 14/681,668, 13 pages.
Notice of Allowance dated Jun. 15, 2017 in U.S. Appl. No. 14/732,294, 9 pages.
Office Action dated Apr. 20, 2017 in U.S. Appl. No. 14/681,668, 14 pages.
Office Action dated Jul. 14, 2017 in U.S. Appl. No. 15/070,446, 8 pages.
Notice of Allowance dated Feb. 12, 2018 in U.S. Appl. No. 15/070,446, 10 pages.

* cited by examiner

SECURITY SYSTEM INCORPORATING MOBILE DEVICE

CROSS-REFERENCES TO RELATED APPLICATIONS

None

BACKGROUND

As methods and devices for engaging in financial transactions have increased, old problems such as fraud and counterfeiting persist. Improved methods and systems for providing greater security in payment transactions are desirable.

Further, the use of mobile devices (such as mobile phones) as payment devices is also becoming more prevalent. It would further be desirable to improve the security of transactions conducted using phones or other types of mobile devices, in a card-present type of transaction environment.

BRIEF SUMMARY

Embodiments disclosed herein may provide for systems, methods, and/or apparatuses that may utilize a mobile device and/or form fill payment processing in a financial transaction. The systems and methods may be implemented using one or more computer apparatuses and/or databases. Although some embodiments are described below with reference to a server computer, embodiments are not so limited and may utilize the methods described herein using any suitable apparatus or system.

In some embodiments, a first server computer may be provided. The first server computer may comprise a processor and a computer readable medium coupled to the processor. The computer readable medium may include code executable by the processor for implementing a method. The method may include the step of electronically receiving an authorization request message that includes a first device verification value from a merchant for a first transaction, where the first device verification value may have been received by the merchant from a mobile device based on an interaction between the mobile device and an access device. In some embodiments, the mobile device may have received the first verification value based on a first request. The method may further include the step of determining by a data processor if the first device verification value corresponds to a stored device verification value.

In some embodiments, in the first server computer has described above, the first request may have been based on an interaction between the mobile device and a portable consumer device associated with the first transaction. In some embodiments, in the first server computer as described above, the interaction between the mobile device and the access device may comprise short-range wireless communication.

In some embodiments, in the first server computer as described above, the method may further include the step of electronically receiving the first request for the first device verification value from the mobile device, where the first request comprises identification information for the portable consumer device. The method may further include the steps of performing by a data processor at least one validation test pertaining to the first request and electronically sending the first device verification value to the mobile device if the at least one validation test is passed. In some embodiments, the method may further include the step of electronically storing the first device verification value.

In some embodiments, in the first server computer as described above, the access device may comprise a point-of-sale terminal (POS). In some embodiments, the first device verification value may comprise a dynamic card verification value 2 (dCVV2), a dynamic primary account number (dPAN), and/or a shared secret value.

In some embodiments, a first method may be provided. The first method may include the steps of electronically receiving an authorization request message comprising a first device verification value from a merchant for a first transaction and determining by a data processor if the first device verification value corresponds to a stored device verification value. In some embodiments, the first device verification value may have been received by the merchant from a mobile device based on an interaction between the mobile device and an access device. In some embodiments, the interaction between the mobile device and the access device may comprise short-range wireless communication. In some embodiments, the mobile device may have received the first verification value based on a first request. In some embodiments, the first request may have been based on an interaction between the mobile device and a portable consumer device.

In some embodiments, the first method as described may further include the steps of electronically receiving the first request for the first device verification value from the mobile device, where the first request may comprise identification information for the portable consumer device. The first method may further include the steps of performing by a data processor at least one validation test pertaining to the first request, electronically sending the first device verification value to the mobile device if the at least one validation test is passed, and electronically storing the first device verification value.

In some embodiments, the first method as described above may further include the steps of generating an authorization response message based at least in part on the determination by the data processor as to whether the first device verification value corresponds to the stored device verification value and electronically sending the authorization response message to the merchant.

In some embodiments, in the first method as described above, the first request may include information associated with the mobile device; and the at least one validation test pertaining to the first request may be based at least in part on the information associated with the mobile device.

In some embodiments, the first method as described above may further include the step of establishing a communications session with the mobile device. In some embodiments, a secured communication channel may be secured by one or more encryption keys. In some embodiments, the first request for the first device verification value may be received through the communications session. In some embodiments, the first device verification value may be provided through the communications channel.

In some embodiments, a mobile device may be provided. The mobile device may include a processor, and a computer readable medium coupled to the processor, where the computer readable medium may comprise code executable by the processor for implementing a method. The method may include the steps of electronically sending a first request for a first device verification value to a server computer and electronically receiving from the server computer the first device verification value. The method may further include the step of electronically sending the first device verification value to a merchant associated with a first transaction based on an interaction between the mobile device and an access device.

In some embodiments, for the mobile device as described above, the method may further include the step of receiving identification information stored on a portable consumer device based on an interaction between the portable consumer device and the mobile device. In some embodiments, the interaction between the mobile device and the access device may comprise short range wireless communication. In some embodiments, the first request may include at least some of the identification information stored on the portable consumer device. In some embodiments, the first device verification value may be received by the mobile device if the first request is validated based at least in part on the identification information.

In some embodiments, the first device verification value sent to the merchant may be included by the merchant in an authorization request message sent to a payment processing network. In some embodiments, the mobile device may comprise a verification token.

In some embodiments, in the mobile device as described above, the method may further include the steps of storing the first device verification value, and electronically sending the first device verification value to a merchant associated with a second transaction based on an interaction between the mobile device and an access device.

In some embodiments, a first method may be provided. The first method may include the steps of electronically sending by a mobile device a first request for a first device verification value to a server computer, electronically receiving at the mobile device the first device verification value from the server computer, and electronically sending by the mobile device the first device verification value to a merchant associated with a first transaction based on an interaction between the mobile device and an access device.

In some embodiments, the first method as described above may further include the step of receiving at the mobile device identification information stored on a portable consumer device based on an interaction between the portable consumer device and the mobile device. In some embodiments, the first request may include at least some of the identification information stored on the portable consumer device. In some embodiments, the first device verification value is received by the mobile device if the first request is validated based at least in part on the identification information In some embodiments, the first method as described above may further include the steps of initiating a first transaction with the first merchant, and interacting with the access device for the merchant associated with the first transaction using the mobile device.

In some embodiments, the interaction with the access device may comprise short-range communication. In some embodiments, the first merchant may include the first device verification value in an authorization request message associated with the first transaction.

In some embodiments, in the first method as described above, the first method may further include the step of presenting the portable consumer device to the first merchant to pay for the first transaction.

In some embodiments, in the first method as described above, the first method may further include the step of presenting the mobile device to the first merchant to pay for the first transaction.

In some embodiments, a first method may be provided that comprises the steps of: electronically sending by a mobile device a first request for first information to a server computer, where the first request is generated based on an interaction between the mobile device and a portable consumer device; electronically receiving at the mobile device the first information from the server computer; and electronically sending by the mobile device the first information to a merchant associated with a first transaction based on an interaction between the mobile device and an access device located at the merchant.

As discussed herein, systems, methods and apparatuses for conducting a financial transaction may be provided. In some embodiments, a consumer may receive a device verification value (e.g. a dCVV2 value) from a verification entity and may use the device verification value as evidence of the authenticity of a financial transaction. For example, during a first transaction, a consumer may use a mobile device (such as a mobile phone) to interact with a portable consumer device (e.g. by swiping a payment card or through use of a contactless interface) to retrieve information stored on the portable device (e.g. an account number, card verification values, expiration date, etc). This information (along with information related to the mobile device) may then be sent to a verification entity (such as, for example, a payment processing network or component thereof) as part of a request for a device verification value. The validation entity may perform one or more validation tests on the received request based on some or all of the information received from the mobile device, and may then return to the mobile device the device verification value (assuming the request is validated). The device verification value may thereby serve as an indication that the portable consumer device, the mobile device, and/or the consumer has been validated. However, embodiments are not so limited, and the mobile device may receive the device verification value in any suitable manner and based on any request (i.e. a request for a device verification value may, but need not, be based on interaction with a portable consumer device).

In some embodiments, the consumer may present the device verification value to a merchant as part of a financial transaction. For instance, in some embodiments, the device verification value may be stored on the consumer's mobile device, and may be transferred to the merchant through a physical interface or, preferably, through the use of short-range wireless communications (e.g. the mobile device may interact with an access device, such as a POS terminal, through a contactless interface) as part of the first financial transaction. The merchant may then generate an authorization request message for the first transaction that includes, inter alia, the device verification value received from the consumer (via the mobile device) along with other transaction related information (such as, for example, the transaction amount, a merchant identifier, information associated with the portable consumer device, etc.). The authorization request message may be sent to a payment processing network. The device verification value included in the authorization request may be compared by the payment processing network (or any other suitable entity) to a stored version of the device verification value associated with the portable consumer device. If these values match, then it is less likely that the transaction is fraudulent.

In some embodiments, the mobile device may further include a secured element such as a verification token that may perform some or all of the functions described herein and thereby reduce the likelihood of tampering with the hardware and/or software. Such a secured element (even if an independent component incorporated within the mobile device, or a separate competent coupled to the mobile device) may be considered a part of the mobile device as used herein.

Thus, in some embodiments, a financial transaction may take place in a card-present type of (e.g. "brick and mortar") environment—i.e. the consumer may be at a merchant location, such as in the merchant's store—rather than a virtual environment, but still provide for increased security for conducting a financial transaction.

DETAILED DESCRIPTION

Figure 1:
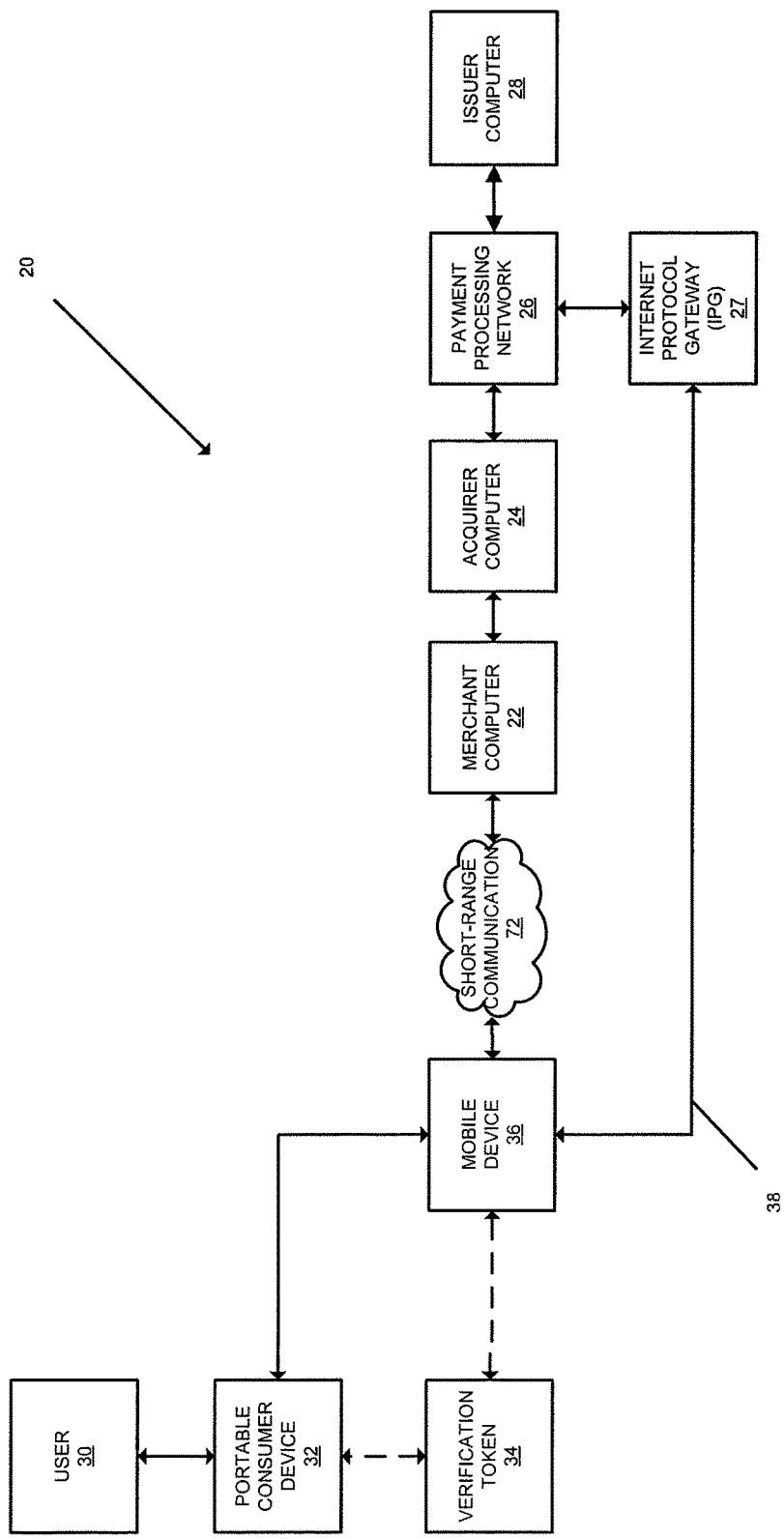
FIG. 1 shows a block diagram of a system according to an embodiment of the invention.

The following disclosure may provide exemplary systems, devices, and methods for conducting a financial transaction and related activities, and in particular, methods of generating and/or obtaining a device verification value using a mobile device, and presenting that device verification value to a merchant for use in authorizing the financial transaction.

This application comprises subject matter that is related to U.S. App. Ser. No. 61/365,119, filed on Jul. 16, 2010, U.S. App. Ser. No. 61/178,636, filed on May 15, 2009, and U.S. application Ser. No. 12/712,148, filed on Feb. 24, 2010, each of which are herein incorporated by reference in their entirety for all purposes.

Before discussing specific embodiments of the invention, some descriptions of some specific terms are provided below.

As used herein, a "mobile device" may comprise any electronic device that may be transported and operated by a user that may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network (such as those used by a payment processing network). Examples of mobile devices include mobile phones (e.g. cellular phones), PDAs, tablet computers, net books, laptop computers, personal music players, hand-held specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device). A mobile device may also comprise a verification token in the form of, for instance, a secured hardware or software component within the mobile device and/or one or more external components that may be coupled to the mobile device.

As used herein, a "portable consumer device" may be any suitable device that allows a transaction to be conducted with a merchant. A portable consumer device may be in any suitable form. For example, suitable portable consumer devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, 2-D barcodes, and the like.

As used herein, an "access device" may be any suitable device for communicating with a merchant computer and for interacting with a portable consumer device and/or mobile device. An access device may in general be located in any suitable location, such as at the same location as a merchant. An access device may be in any suitable form. Some examples of access devices include POS devices, cellular phones, PDAs, personal computers (PCs), tablet PCs, handheld specialized readers, set-top boxes, electronic cash registers (ECRB), automated teller machines (ATMs), virtual cash registers (VCRs), kiosks, security systems, access systems, Websites, and the like. An access device may use any suitable contact or contactless mode of operation to send or receive data from portable consumer device and/or mobile device.

In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, magnetic stripe readers, etc. to interact with a portable consumer device and/or mobile device.

As used herein, a "verification token" may refer to a secured device or component of a device (such as a software or hardware module) that may be used to authenticate or validate a user or portable consumer device. That is, for example, the verification token may refer to a secured component (or components) of a mobile device used to determine that a user is not misrepresenting his identity and/or that he has in his possession a portable consumer device. An example of a verification token is provided in U.S. application Ser. No. 12/712,148 to Hammad, which is again hereby incorporated by reference in its entirety. In general, a verification token may take any suitable form, including an embedded software/hardware module in a mobile device or an attachment to a mobile device (such as a USB stick or other periphery component). As used herein, a verification token that is coupled to, or embedded within, a mobile device may be considered a component of the mobile device (even if the verification token could be physically separated from the mobile device). In some embodiments (e.g. where the verification token is an external component), a verification token that may be coupled to or embedded within a mobile device may utilize short-range communication (such as near-field communication including RFID or Bluetooth®) or a physical interface (such as through the use of a magnetic strip reader) to obtain information stored on a portable consumer device. As contemplated herein, this comprises the mobile device "interacting" with the portable consumer (albeit through a component that may be separately identified as the verification token).

As used herein, "identification information" may include any suitable information associated with an account (e.g. a payment account and/or portable consumer device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a portable payment device. CVV2 values are generally visible to a user (e.g., a consumer), whereas CVV and dCVV values are typically embedded in memory or authorization request messages and are not readily known to the user (although they are known to the issuer and payment processors).

As used herein, a "device verification value" may include any information related to the validation of a verification token, a user, a portable consumer device, and/or a mobile device used or associated with a financial transaction. For instance, a device verification value may be information that indicates whether a request sent from a mobile device (and/or a verification token associated with the mobile device) has been validated using any number of validity tests. Exemplary validity tests are described in detail in U.S. patent application Ser. No. 12/712,148 to Hammad entitled "Verification of Portable Consumer Devices," which is hereby incorporated by reference in its entirety. In this manner, in some embodiments a "request for a device verification" value sent by a mobile device (and/or verification token within, or coupled to, the mobile device) may comprise a message that includes information such as "identification information" for a portable consumer device or user, as well as information associated with the mobile device (and/or verification token) such as a serial number, IP address, account number associated with the mobile device, SIM card information, etc. This information may be used by a validation entity to validate the request and return a device verification value. The device verification value may thereby comprise any information or data that is generated after a request for a verification value is validated (in some instances after a mobile device interacts with the portable device). For instance, the verification information could comprise any dynamic value (such as a dCW2, dPAN, or other shared secret value) that is generated by a validation entity and sent to a mobile device (and/or verification token) that has interacted with an associated portable consumer device.

As used herein, "transaction information" may include any suitable information related to a financial transaction, such as those conducted with a merchant. This may include a transaction amount, a merchant identifier for the merchant associated with the transaction, and the volume of the transaction or accumulation of previous transactions (for instance, if there are many similar purchases, or many purchases within a short amount of time). It may also include the type of goods, the merchant location, and any other information that is related to the current transaction.

An "authorization request message" may be a message that includes an issuer account identifier. The issuer account identifier may be a payment card account identifier associated with a payment card. The authorization request message may request that an issuer of the payment card authorize a transaction. An authorization request message according to some embodiments may comply with ISO 8583, which is a standard for systems that exchange electronic transactions made by cardholders using payment cards. An authorization request message may comprise data elements including, in addition to the account identifier, a service code, a CVV (card verification value), and an expiration date. An authorization request message may also comprise some or all of the information associated with a transaction, such as the "account information" and/or the "transaction information," as well as any other information that may be utilized in determining whether to authorize a transaction (e.g. a device verification value). An authorization request message may also comprise a device verification value (e.g. a dCVV2).

An "authorization response message" may be an issuing financial institution's electronic message reply to an authorization request, which may include one or more of the following status indicators: Approval—transaction was approved; Decline—transaction was not approved; or Call Center—response pending more information, merchant must call the toll-free authorization phone number. It may also include an authorization code, which may be a code that a credit card issuing bank returns in an electronic message to the merchant's POS equipment that indicates approval of the transaction. The code serves as proof of authorization. In some embodiments, a payment processor network may generate or forward the authorization response message to the merchant.

A "communications channel" may include any suitable path for communication between two or more entities. Suitable communications channels may be present directly between two entities such as a client computer and a gateway server, or may include a number of different entities. Any suitable communications protocols may be used for communications channels according to embodiments of the invention.

As used herein, a "server computer" is typically a powerful computer or cluster of computers. For example, the server computer can be a large mainframe, a minicomputer cluster, or a group of servers functioning as a unit. In one example, the server computer may be a database server coupled to a Web server.

Embodiments disclosed herein may provide for systems, methods, and/or apparatuses that may utilize, for example, a form fill and mobile device payment processing for a financial transaction. The system, apparatus, and methods may be implemented using one or more computer apparatuses, mobile devices, and/or databases. Although some of the description provided below may make reference to a mobile phone, embodiments are not so limited and may utilize the features and aspects described herein in any suitable system or mobile device. Similarly, although embodiments described below may reference a server computer, embodiments are not so limited and may utilize the aspects and features described herein in any suitable system or device.

As noted above, methods, systems, and apparatuses that provide for increased security for financial transactions, particularly in transactions where a payment device may not be presented to a merchant (e.g. purchases over the Internet, telephone, etc.), have been developed that may reduce the occurrence of fraud and may give additional assurances that valid transactions are in fact genuine (reducing the likelihood that a valid transaction may be rejected as suspicious). Although such transactions involving remote consumers and merchants are generally more susceptible to fraudulent activity due, in part, to the inherent uncertainties that may exist in such transactions (e.g. based on the anonymity that may exist), in-person transactions may also be susceptible to such fraudulent activity as well. However, most systems and methods that have been developed for such environments may rely on the security features contained within the payment device itself, which may be presented to the merchant in conducting the transaction. Thus, these methods and systems may not provide adequate protection in situations such as, for instance, when the payment device itself is stolen or copied by a nefarious party without the knowledge of consumer.

Thus, while the likelihood that fraudulent transactions may occur during in-person financial transactions may not be as high as in the remote entity circumstances, it is still a possible event and does in-fact occur on a routine basis. One factor that may further increase the chance of successfully conducting such fraudulent in-person transactions is that merchants do not typically inspect such portable consumer devices offered by a consumer as payment during these in-person purchases, which may be due to the fact that Merchants do not want to negatively impact the consumer's overall shopping experience by such inquiries (or the Merchants simply do not appreciate the risk of, and/or are not liable for, a fraudulent transaction). Therefore, it may be preferred that, in some embodiments, an exemplary approach to improve security may not overly burden either the Merchant or the consumer in conducting such transactions.

Although not limited to use only in completing in-person transactions, some embodiments provided herein may address some of the concerns noted above regarding such fraudulent activity related to in-person transactions.

Figure 5:
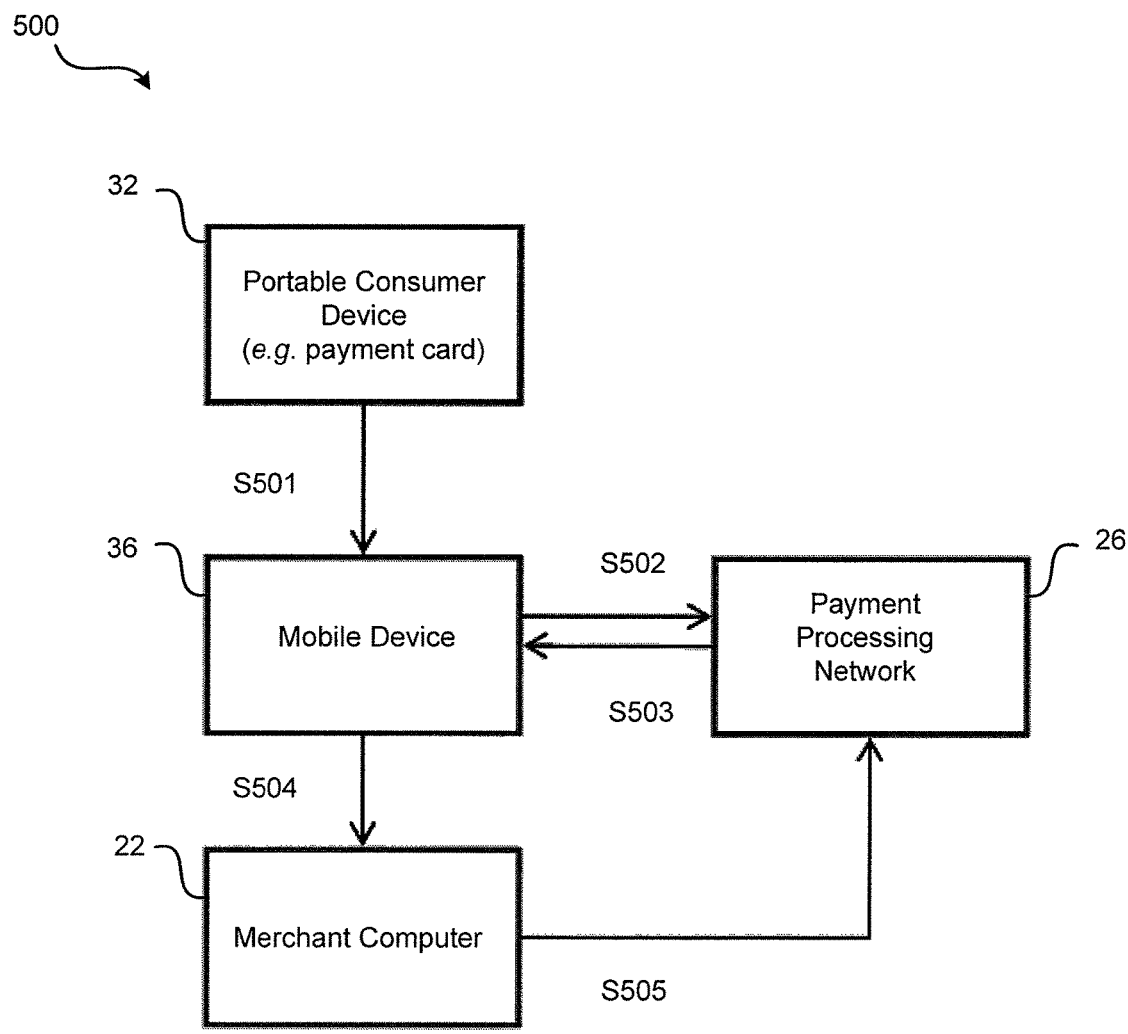
FIG. 5 shows an illustration of components of a system and exemplary interactions and steps performed of a method in accordance with some embodiments.

With reference to FIG. 5, an exemplary method that may be performed by several exemplary components of a system 500 that may provide for increased security in conducting a financial transaction is shown for illustration purposes. As shown in FIG. 5, at step S501, a consumer may present a portable consumer device (e.g. a payment device such as a credit card, debit card, etc.) 32 to a mobile device 36. That is, for example, the consumer may swipe a portable consumer device 32 having a magnetic stripe using a periphery of the mobile device 36 (e.g. a physical interaction) or may use any suitable form of short range communications (e.g. near field communication, RFID, Bluetooth®, etc.). In this manner, identification information that may be stored on the portable consumer device 32 may be obtained (e.g. received) by the mobile device 36. This information may be retained (e.g. stored) in the mobile device 36 in a secured location, for instance by using either software or hardware components (e.g. a verification token).

At step S502, the mobile device 36 may establish communications with a payment processing network 26 so as to send a request for a device verification value (e.g. a dCVV2 value). The request may comprise some or all of the identification information that the mobile device 36 received from the portable consumer device 32. In some instances, the mobile device 36 may also send information related to the mobile device 36 or components thereof (e.g. part serial numbers, mobile account information, etc) and/or information about the consumer (e.g. a username or password). The payment processing network 26 may utilize some or all of the information that was included in the request for the device verification value to validate the mobile device 36, the consumer, and/or the portable consumer device 32. In this manner, embodiments may provide a method for increasing the certainty that a consumer is in possession of a valid and authentic portable consumer device 32.

If the request sent by the mobile device 36 is validated (which may involve passing one or more validation tests), then at step S503 the payment processing network 26 may send back to the mobile device 36 a device verification value (e.g. dCVV2 value). The payment processing network 26 may also store the device verification value for later comparison and validation during an authorization process, or may send this value to another entity that may perform such validation (e.g. a merchant, an issuer, etc.).

At step S504, the mobile device 36 may interact with an access device at a merchant (which may interface with the merchant computer 22) and thereby send (e.g. pass) the device verification value received in step S503 to the merchant computer 22. This interaction may be performed, for example, by short range wireless communications or through a physical interaction between the mobile device 36 and an access device coupled to the merchant computer 22 (e.g. via a POS terminal). This interaction may be performed, for instance, during a first transaction between the merchant and the consumer, where the consumer may choose to use the portable consumer device 32 to pay for the transaction. That is, for instance, the consumer could provide the portable consumer device 32 to the merchant and/or interact with an access device coupled to the merchant computer 22 using the portable consumer device 32 (e.g. a physical interaction or through short range communications). The consumer may then be prompted to provide a device verification value, at which point the mobile device 36 may interact with the an access device (which may be the same access device or a different access device) coupled to the merchant computer 22 to pass the device verification value received by the mobile device 36 in step S503. The merchant computer 22 may then generate an authorization request message that includes transaction related data, and may form fill the request using the device verification value received form the mobile device 36.

At step S505, the merchant computer 22 may initiate a typical authorization and clearance procedure with the payment processing network 26 using the information associated with the portable consumer device 32 and the device verification value received from the mobile device 36. Moreover, the device verification value that the merchant computer 22 included in the authorization request message may be compared to the device verification value stored by the payment processing network 26 in step S503. If the two values match, then the payment processing network 26 may have further assurance that the transaction is authentic.

In this manner, some embodiments may provide for increased security for financial transactions (particularly those conducted in a brick and mortar environment—e.g. in-person). Moreover, by utilizing processes such as passing values between components of the system using, e.g., short range communications, some embodiments provided herein may reduce the inconvenience of the process for both the merchant and the consumer, without necessarily compromising the security provided.

Although steps S502 and S503 were described above with reference to the payment processing network 26 as the validation entity, embodiments are not so limited. For instance, in some embodiments, a separate validation entity that may be located at the payment processing network 26, or at an entirely separate entity (that may be in communication with the payment processing network 26) may validate the request sent by the mobile device 36 and generate the device verification value. In addition, the communications between the mobile device 36 and the validation entity (shown as the payment processing network 26 in FIG. 5) may be performed through a secured communications channel (such as an encrypted SSL session). This may provide for increased security in the system, and may increase the difficulty for the device verification value to be intercepted and/or utilized by a nefarious party.

Although the exemplary method described above, and with particular reference to steps S501-S503, was described as including an interaction between a mobile device and a portable consumer device to generate a request for a device verification value that may include information from the portable consumer device that may then be used by a validation entity to validate the request, embodiments are not so limited. That is, for instance, the mobile device may receive the device verification value (which, as described above, may comprise a dCCV2 value) in any suitable manner and thereby need not based on the validation process as described above. That is, by way of example only, the consumer may register in advance with an issuer or payment processing network, and may send a request for a device verification value to either of these entities (e.g. by utilizing a username and password system, challenge—response system, etc). For instance, The consumer could enter his credentials and receive from the issuer or payment processing network the device verification value if the credentials are correct and/or validated. In some embodiments, the mobile device could be registered in advance, and thereby if the mobile device sends a request for a device verification value, the receiving entity (such as the issuer or the payment processing network) may return a device verification value for a portable consumer device associated with the mobile device. In some embodiments, an application (or other software or hardware module) may be installed on the mobile device and may be configured to function only with regard to the registered device, which may add security to the process. The above are just a few examples provided for illustration purposes; however, any suitable method of receiving a device verification value on a mobile device may be utilized.

EXEMPLARY EMBODIMENTS

Described below are further exemplary embodiments of methods, systems, and apparatuses that may comprise form fill and mobile device payment processing. The embodiments described herein are for illustration purposes only and are not thereby intended to be limiting. After reading this disclosure, it may be apparent to a person of ordinary skill that various components and features as described below may be combined or omitted in certain embodiments, while still practicing the principles described herein.

In some embodiments, a first server computer may be provided. The first server computer may comprise a processor and a computer readable medium coupled to the processor. The computer readable medium may include code executable by the processor for implementing a method. The method may include the step of electronically receiving an authorization request message that includes a first device verification value from a merchant for a first transaction, where the first device verification value may have been received by the merchant from a mobile device based on an interaction between the mobile device and an access device. As was described above, the interaction between the mobile device and the access device may have comprised a short-range wireless communication or a physical interaction (such as a magnetic swipe, USB interface, etc.). The mobile device may have received the first device verification value based on a first request. The method may further include the step of determining by a data processor if the first device verification value corresponds to a stored device verification value.

As was noted above, the first request may be sent by the mobile device to any suitable entity, and may include any relevant information. For example, the first request may include information about a consumer (such as a username and password), information about the mobile device (such as SIM card information, application specific information, serial number, etc.), and/or information corresponding to a portable consumer device (e.g. account number, expiration date, etc.). In some embodiments, the first request may be initiated based on a request by a user (e.g. a user may initiate the first request) and/or may the request may be based on a interaction between a mobile device and a portable consumer device (e.g. the mobile device may automatically generate a request after such an interaction). However, in some embodiments, so long as the device verification value may be received by the mobile device, the form of the request, the information that it may contain, and/or the entity that the request is sent to may not affect the functioning of the method and system (or components therein).

In general, the term "based on interaction," as used herein may include any suitable method of facilitating the transfer of information stored on one device to another (e.g. from the portable consumer device—such as a credit card—to the mobile device (or a component thereof) and/or from the mobile device to an access device—such as an access device).

For example, in some embodiments, the merchant may receive the stored device verification value from the mobile device based on an interaction between the mobile device and an access device. That is, for instance, in some embodiments after the first device verification value is received by the mobile device, the mobile device (which may, for instance, comprise a contactless interface or other short-range communication capability) may establish communications with the merchant through an access device (where an access device is described below). In this manner, embodiments may provide a secure way to send the device verification value to the merchant from the mobile device for use in an authentication request message. Moreover, in some embodiments where the mobile device comprises a secure component (e.g. hardware or software corresponding to a verification token), the interaction with the merchant's access device may be the most efficient manner of retrieving the device verification value from the mobile device, which also may prevent fraudulent activity such as, for instance, if a unscrupulous party were to acquire the device verification value (which may be the case if it is unsecured and/or presented to a user) and attempt to authenticate a transaction. However, embodiments are not so limited, and in some instances, the device verification value may be presented to a consumer (e.g. graphically), and the consumer may then pass that information to the merchant for inclusion in the authentication request.

The use of the term "stored" with regards to the "stored device verification value" does not necessarily mean that it is different than the "first" device verification value, but is simply used to differentiate the device verification value that is generated, received, and/or stored by the sever computer (or other validation entity) in an initial validation process (examples of which are described below), with the device verification value that is received by the server computer in the authorization request message. For example, when a transaction is valid, the stored device verification value may correspond to the first device verification value that was first received by the mobile device based on an interaction with the portable consumer device, and which was then sent from the mobile device to the merchant. That is, for instance, the server computer may retrieve the stored verification value and compare this to the received first verification value. If there is a correspondence (e.g. if the values match), the server computer has an additional indication that the transaction may be valid. If the values do not match, then this may indicate that there is an increased risk that the transaction is fraudulent.

In some embodiments, and as was discussed above, the interaction between the mobile device and the access device may comprise short-range communication. As used herein, "short range communication" or "short range wireless communication" may comprise any method of providing short-range communications capability, such as RFID, Bluetooth™, infra-red, or other data transfer capability that can be used to exchange data between a portable consumer device, an access device, and/or an emulation device. In some embodiments, short range communications may be in conformance with a standardized protocol or data transfer mechanism (e.g., ISO 14443/NFC). Short range communication typically comprises communications at a range of less than 5 meters. In some embodiments, it may be preferable to limit the range of short range communications (such as to a range of less than 1 meter, less than 10 centimeters, or less than 2.54 centimeters) for security, technical, and/or practical considerations. For instance, it may not be desirable for a POS terminal to communicate with every portable consumer device that is within a 10 meter radius because those two devices may not be involved in a transaction, or it may interfere with a current transaction involving different financial transaction devices.

In general, the use of short range communications may be preferred in some embodiments because it permits devices that otherwise may have no immediate manner to communicate (e.g. the devices may not have corresponding physical interfaces) to do so—and beneficially do not require physical contact, which may avoid damage. Moreover, this may provide for quick communication, with minimal effort on the part of the entities involved in the transaction. The use of short range communications may be used when the merchant and the consumer are in close geographic proximity, such as when the consumer is at the merchant's place of business. In some embodiments, the access device may include a point-of-sale terminal (POS).

The term "associated with a first transaction" may generally refer to when the portable consumer device is presented or selected by a consumer as a payment method for a transaction. For instance, the consumer may present the portable consumer device to the merchant, who may then utilize the card to complete the transaction (e.g. as a typical credit card transaction). In some embodiments, the information associated with the portable consumer device may be received and stored on the mobile device (e.g. based on the interaction that may initiate the request for the device verification value), such that only the mobile device may need to be presented to the merchant (e.g. a POS terminal) to complete the transaction. Such embodiments may be preferred in some instances, because, for example, the portable consumer device need only be interacted with once, and the relevant information corresponding to both the portable consumer device and the device verification value may be sent to the merchant via a single interaction.

In some embodiments, in the first server computer as described above, the method may further include the step of electronically receiving the first request for the first device verification value from the mobile device, where the first request comprises identification information for the portable consumer device. The method may further include the steps of performing by a data processor at least one validation test pertaining to the first request and electronically sending the first device verification value to the mobile device if the at least one validation test is passed.

For instance, in some embodiments, the user may present (e.g. move into close proximity or physically contact) the portable consumer device (e.g. a payment card) to a mobile device (e.g. a mobile phone). The mobile device may comprise a short-range communication interface (e.g. a contactless interface, Bluetooth®, etc.) or other suitable interface (such as a magnetic stripe reader), for which the portable consumer device may comprise a compatible interface. In this manner, the information stored on the payment device (which may include information hidden from a user so as to prevent its misappropriation) may be received and utilized by the mobile device in generating a request that may be sent to the server computer, such that the server may validate the consumer and/or a transaction associated with the portable consumer device. In this regard, and as detailed below, the mobile phone may have one or more secured components (which may, for example, comprise a verification token), such that the information obtained from the portable consumer device (e.g. payment card) not only remains secure, but that any entity that receives such information from the mobile device may have further assurance that the payment card was actually presented to the mobile device. For embodiments comprising a verification token, the verification token may also have stored thereon instructions for operations to perform the validation process, including, for example, the location of the server computer, the format of the request to generate, etc. In some embodiments, this may be stored in a non-secure application (or hardware) on the mobile device, or within the portable consumer device.

As noted above, the server computer (an example of which is described in detail with reference to FIG. 2) may receive a "request" from the mobile phone for a device verification value. The request may be in any suitable form, including an electronic message that comprises one or more packets of data. The request may be received by the server computer and may comprise any suitable information related to, for instance, the portable consumer device, the mobile device, the user, or even transaction information (to the extent that any may exist at the time). As described below, this information may be used to validate the request, and thereby provide additional assurances that the consumer (or the portable consumer device) is valid. Moreover, the request may be sent via a secured channel and/or over any suitable network, including the Internet or over a private network.

Thus, as was noted above, a device verification value (such as was described above), may provide information that may be subsequently used to authenticate the consumer, mobile device, and/or a financial transaction. That is, for instance, a consumer that possesses a valid device verification value (or for which a valid device verification value may be presented during the completion of a financial transaction that indicates that the consumer and/or mobile device has been validated) may provide additional assurances that the consumer is the rightful holder of the portable consumer device and the financial transaction is not fraudulent. Thus, prior to providing such information, the server computer may conduct one or more validation tests. Exemplary validation tests for use with a "verification token" are described, for example, in U.S. application Ser. No. 12/780,657 filed on May 14, 2010 to Hammad, the entire disclosure of which is hereby incorporated by reference. Many of the principles and validation tests described therein may be equally applicable to validation of the request sent from a mobile device as described herein (particularly if the device comprises a secured component corresponding to a verification token). For example, the request may include identification information that identifies the payment account associated with a portable consumer device as well as information that corresponds to the mobile device (e.g. serial number, wireless account information, SIM card information, etc.). In some embodiments, the server computer may comprise (or be in communication with) a database that associates the payment account information with a particular mobile device, and thus if such information is included by the mobile device in the request, the server computer may be more assured that this is a valid request because the consumer not only is in possession of the portable consumer device, but also a mobile device associated with the payment device.

Some embodiments of systems and methods that may utilize a server computer to validate a request received from a mobile device (e.g. based on an interaction with a portable consumer device) may be utilized, for instance, in a "brick and mortar" environment, rather than (or in addition to) in a remote transaction environment (e.g. e-commerce). For example, the mobile device may be used by the consumer in different locations (such as at different merchant locations), and may provide relatively quick validation and response to a request sent by the mobile device, with minimal effort on the part of both the merchant and the consumer. The device verification value received from the server may then be provided as part of a subsequent transaction (e.g. in an authentication request message), and may be used by an authorization entity to determine whether to approve a transaction, as described in detail herein.

In some embodiments, in the first server computer as described above, the method may further include the step of electronically storing the first device verification value by the server computer. That is, for instance, if the first request for a first device verification value is validated such that a device verification value is sent to the requesting mobile device, the server computer (e.g. the validation entity) may also store the first device verification value (or send the first device verification value to an entity or a database that may store the device verification value). The stored first device verification value may be later used in a comparison to determine if, in a subsequent transaction, the portable consumer device and/or the consumer is authentic. That is, for instance, the device verification value may function similar to a shared secret, and the server computer (or other validation or authentication entity) may use this shared secret value to authenticate a transaction involving the portable consumer device, as described above.

In some embodiments, in the first server computer as described above, the method may further include the steps of: generating an authorization response message based at least in part on the determination by the data processor as to whether the first device verification value is the same as the stored device verification value, and electronically sending the authorization response message to the merchant. That is, as noted above, the server computer (or other authorization entity) may compare the received device verification value with the stored device verification value (generated during the validation of the first request from the mobile device) as further criteria in determining whether to authorize a transaction comprising the portable consumer device. In some embodiments, if the first device verification value and the stored device verification value do not correspond (i.e. match), the transaction may be declined. In some embodiments, if the first device verification value and the stored device verification value do no correspond, then this may be considered as part of several other factors (such as the merchant identifier, volume of transactions, transaction histories, etc.) to determine a risk score associated with a transaction. An example of risk score determinations is provided in U.S. application Ser. No. 13/184,080 filed Jul. 15, 2011 to Hammad entitled "Token Validation for Advanced Authorization," which is hereby incorporated by reference in its entirety.

In some embodiments, in the first server computer as described above the first request may further include information associated with the mobile device. In some embodiments, the step of validating the received first request may be based at least in part on the information associated with the mobile device. As was described above, the "information associated with the mobile device" may comprise any information that may be used to identify the mobile device (and/or an associated verification token), including, by way of example only, SIM card information, IP address information, hardware specific information, token serial number, phone number, wireless account number, etc.

In some embodiments, the mobile device may include a verification token. As was described above, a "verification token" may comprise a separate component coupled to the mobile device, or it may comprise a hardware or software module disposed within the mobile device. However, in general, a verification token may simply refer to a secured component of the mobile device that may, or may not, comprise instructions for initiating and/or completing a request a device verification value. In some embodiments, the mobile device may be anyone of: a mobile phone, a PDA, a tablet computer, a net book, a laptop computer, a personal music player, or a hand-held specialized reader.

In some embodiments, the first device verification value may include anyone of a: dynamic card verification value 2 (dCVV2), a dynamic primary account number (dPAN), and/or a shared secret value. As was described above, the device verification value may comprise any data that may be used by the mobile device and/or the server computer (or other authorization entity) to determine if a portable consumer device (or a mobile device or consumer associated with the portable consumer device) involved in a transaction was previously validated. In this regard, it may be preferred that the device verification value (regardless of characterization) remain a secret known only to the authentication entity and the mobile device, such that when the device verification value is subsequently received by the server computer, this may be an indication that the transaction is authentic.

In some embodiments, in the first server computer as described above, the method may further include the step of establishing a communications session with the mobile device. In some embodiments, the secured communication channel may be secured by one or more encryption keys. In some embodiments, the request for the device verification value may be received through the communications session.

In some embodiments, the device verification value may be provided through the communications channel. That is, it may be preferred that the mobile device and the server computer communicate over a secure communications session (e.g. a secure channel) so that when the server computer sends the device verification value, another party may not be capable of intercepting that value and then using the device verification value to complete a transaction. The secured communication session may be established in any suitable manner. For instance, the sever computer could register the mobile device (and its IP address or related information) for a session. A session key may then be established upon mutual authentication to support the communications for that session between the mobile device and the host. The data exchanged between the token and the server computer (e.g. the backend host) may be encrypted and tunneled through an SSL session. The session could stay alive or be terminated or restarted at any time.

In some embodiments, a first method may be provided. The first method may be performed, in whole or in part, by one or more computers (e.g. server computers) and/or one or more software/hardware components within a computer. The first method may include the steps of electronically receiving an authorization request message comprising a first device verification value from a merchant for a first transaction and determining by a data processor if the first device verification value corresponds to a stored device verification value. In some embodiments, the first device verification value may have been received by the merchant from a mobile device based on an interaction between the mobile device and an access device, where the interaction between the mobile device and the access device may comprise, by way of example, short-range wireless communication or a physical interaction. The mobile device may have received the first verification value based on a first request. In some embodiments, the first request was based on an interaction between the mobile device and a portable consumer device. In some embodiments, the first request was based on information provided by a consumer (where the information may have been entered in advance of the generation of the first request—e.g. it may have been stored on the mobile device—or the information may have been entered concurrently with the generation of the first request—e.g. entering in a username and password, challenge response, etc.).

As was described above, the device verification value may be stored (e.g. by an authentication entity) and used as an indication as to whether a mobile device and/or portable consumer device used as part of a transaction with a merchant is authentic. Moreover, the authorization request may be initiated by, for instance, an interaction between a consumer's mobile device (which may have stored thereon the first device verification value) and a merchant's access device. This may be an efficient manner of sending a previously received device verification value from the mobile device to the merchant to authorize a transaction (i.e. to include the device verification value in an authorization request).

In some embodiments, the first method as described may further include the steps of electronically receiving the first request for the first device verification value from the mobile device, where the first request may comprise identification information for the portable consumer device. The first method may further include the steps of performing by a data processor at least one validation test pertaining to the first request, electronically sending the first device verification value to the mobile device if the at least one validation test is passed, and electronically storing the first device verification value. As noted above, a mobile device may establish communications with a validation entity (such as a server computer or IP gateway), and may then request a device verification value from such an entity. The validation entity may use any information received from the mobile device along with, for instance, previous data stored about the portable consumer device and/or mobile device such as: black lists (devices associated with fraudulent activity), white lists (devices not associated with fraudulent activity), associations between portable devices and mobile devices (e.g. registration of information), etc. so as to validate the request. Although not limited thereto, the use of a mobile device may provide for embodiments that may make "brick and mortar" transactions (e.g. where the consumer may be located at the merchant location) more secure, while not substantially increasing the burden on either party.

In some embodiments, the first method as described above may further include the steps of generating an authorization response message based at least in part on the determination by the data processor as to whether the first device verification value corresponds to the stored device verification value and electronically sending the authorization response message to the merchant. In some embodiments, in the first method as described above, the first request may include information associated with the mobile device; and the at least one validation test pertaining to the first request may be based at least in part on the information associated with the mobile device.

In some embodiments, a mobile device may be provided. The mobile device may comprise a processor, and a computer readable medium coupled to the processor that may include code executable by the processor for implementing a method. The method may include the steps of electronically sending a first request for a first device verification value to a server computer, electronically receiving from the server computer the first device verification value The use of a mobile device in some embodiments may provide for increased mobility and flexibility, and may also provide for validation of a portable consumer device "on the fly" while, for instance, a consumer is located at a merchant. In some embodiments, the method may further include the steps of receiving identification information stored on a portable consumer device based on an interaction between the portable consumer device and the mobile device. In some embodiments, the first request may include at least some of the identification information stored on the portable consumer device. In some embodiments, the device verification value is received from the server computer only if the first request is validated. In some embodiment, the validation of the first request may be based at least in part on the identification information.

Moreover, utilizing a mobile device may permit increased security during traditional transactions that otherwise may rely almost entirely on the security features corresponding to the portable consumer device itself. For example, a mobile device may be linked to a wireless phone account or mobile phone serial number (e.g. in a database). The mobile device may send this information along with the request for the first device verification value to a validation entity (e.g. server computer and/or a gateway computer). The server computer (e.g. validation entity) may receive this information and determine if the received information matches any records stored therein. If it does not, then the mobile device may not receive the device verification value from the server computer. Thus, if for example a nefarious party steals a consumer's credit card, and then attempts to receive a dynamic verification value for the credit card to be used in a transaction, even though the nefarious party is in physical possession of the credit card (which previously may have been sufficient to complete the fraudulent transaction), he may not receive the device verification value and thereby such a transaction may be later denied. This example is provided for illustration purposes only, and as was noted above, there may be any number of suitable ways that may be used to validate the first request.

In some embodiments, in the mobile device as described above, the method may further include the step of: electronically sending the first device verification value to a merchant associated with a first transaction based on an interaction between the mobile device and an access device. In some embodiments, the interaction between the mobile device and the access device may include short-range communication. In some embodiments, the access device may be located at the merchant associated with the first transaction. As was noted above, embodiments may be utilized by consumers when located at a merchant, and thereby once the device verification value is received, the inventors have found that a relatively efficient and secure way of passing this information between the mobile device and the merchant may be to use a short-range communication interface (particularly in embodiments where the device verification value is stored in a secure hardware or software component of the mobile device). For example, mobile devices (such as mobile phones) may be constructed with short-range communications capability, and thereby provide increase functionality and security without an increased burden on the consumer.

In some embodiments, in the mobile device as described above that includes a processor and a computer readable medium comprising code that may be executable by the processor for performing of the above methods, the first device verification value sent to the merchant by the mobile phone may be included by the merchant in an authorization request message that may be sent to a payment processing network. By including the device verification value in the authentication request, in some embodiments, the authorization entity (which may be located at a payment processing network) may receive the device verification value and may compare this value to a stored value that corresponds to the device verification value previously sent to the mobile device thereby increasing the security of such transactions.

In some embodiments, in the mobile device as described may include a verification token. As noted above, the verification token of a mobile device may refer to a secure hardware of software component of the mobile device. In some embodiments, the verification token may be an external component that may be coupled/decoupled to the mobile device. The verification token, in some embodiments, may include its own short-range communications interface. It may be preferred in some embodiments to utilize a verification token that is a separate component from the mobile device that may be coupled and decoupled to a mobile device such that a consumer could use the verification token with multiple mobile devices or fixed devices (i.e. it would not require the consumer to purchase multiple verification tokens). Moreover, this may facilitate, in some embodiments, the linking of a portable consumer device with a particular hardware component, and thereby provide more security. For example, if the portable consumer device is used with a verification token or mobile device that is not the verification token that it is usually associated with, it may be likely that the transaction is fraudulent).

In some embodiments, in the mobile device as described above that includes a processor and a computer readable medium comprising code that may be executable by the processor for performing the methods described above, the method may further include the step of: sending to the server computer at least one of: a token serial number, a phone number, an IP address, a mobile phone serial number, a wireless account number, a SIM card information. This information that may be associated with the mobile device (and/or a verification token comprised within the mobile device) may be utilized in some embodiments by a validation entity so as to validate the request for the device verification value. For instance, the information associated with the mobile device may be stored at the server computer and associated with a portable consumer device prior to the receipt of a request from a mobile device. In some embodiments, the information (which may be unique to a mobile device) may be included on a white list or a black list (e.g. of known fraudulent entities). However, as described above, this information may be used in any suitable manner to validate the request and confirm the authenticity of the portable consumer device, the consumer, and the mobile device.

In some embodiments, in the mobile device as described above that includes a processor and a computer readable medium comprising code that may be executable by the processor for performing the methods described above, the method may further include the steps of storing the first device verification value, and electronically sending the first device verification value to a merchant associated with a second transaction based on an interaction between the mobile device and an access device. That is, for instance, in some embodiments, a single device verification value may be used to authenticate multiple transactions. This may reduce the number of operations that the payment processing system (or other validation entity) needs to perform. For example, there could be a fixed number of transactions for which a device verification value may be used for prior to a new verification needing to be generated, or the device verification value may be valid for a fixed period of time. Embodiments may thereby provide for increased security associated with the use of a device verification value, but reduce inconvenience to the consumer and/or data traffic on a network.

In some embodiments, a first method may be provided. The first method may be performed, in whole or in part, by one or more computers (e.g. server computers and/or mobile devices) and/or one or more software/hardware components within a computer. The first method may include the steps of: electronically sending, by a mobile device, a first request for a first device verification value to a server computer and electronically receiving, at the mobile device, the first device verification value from the server computer.

In some embodiments, the first method as described above includes the step of receiving, at the mobile device, identification information stored on a portable consumer device based on an interaction between the portable consumer device and the mobile device. In some embodiments, the first request as described above may include at least some of the identification information stored on the portable consumer device. In some embodiments, the device verification value is revived if the first request is validated based at least in part on the identification information.

In some embodiments, the first method as described may further include the steps of initiating a first transaction with a first merchant, interacting with an access device for the merchant associated with the first transaction using the mobile device, and electronically sending, via the mobile device, the first device verification value to the merchant associated with the first transaction based on the interaction between the mobile device and an access device. In some embodiments, the method may further include the steps of initiating a first transaction with the first merchant, and interacting with the access device for the merchant associated with the first transaction using the mobile device. In some embodiments, the interaction with the access device may comprise short-range wireless communications and/or a physical interaction. In some embodiments, the first merchant may include the first device verification value in an authorization request message associated with the first transaction.

In some embodiments, in the first method as described above, the first method may further include the step of presenting the portable consumer device to the first merchant to pay for the first transaction. In some embodiments, the first method may include presenting the mobile device to the first merchant to pay for the first transaction.

In some embodiments, another method may be provided that comprises the steps of electronically sending by a mobile device a first request for first information to a server computer, wherein the first request is generated based on an interaction between the mobile device and a portable consumer device; electronically receiving at the mobile device the first information from the server computer; and electronically sending by the mobile device the first information to a merchant associated with a first transaction based on an interaction between the mobile device and an access device located at the merchant.

As used in this connect, the "first information" may refer to any information that may be used by the consumer, merchant, and/or the mobile device to for use in completing or authenticating the transaction. Some examples of first information could include a verification value, a dynamic verification value, an account number, an account balance, an authorization message, an IP address, a session key, an account identifier, an expiration date, previous transaction information, or any other relevant category of data. The information may be used by the merchant and/or payment processing network in any suitable manner. For example, when the first information comprises a verification value, the merchant computer may include this information in an authorization request message to complete the first transaction (e.g. for the payment processing network to verify that the transaction is authenticated). When the first information comprises an account balance, the merchant computer may use this information to determine whether the consumer has sufficient funds to complete the transaction or if an alternative payment method may be required. When the first information comprises an account number, the merchant computer may use the account number to identify an approiate payment method to be used to complete the transaction (which may also be used by the payment processing network when authorizing the transaction). When the information comprises an IP address, the merchant computer may contact a server computer or router at the IP address and send or receive relevant information based on this connection (such as when the IP address corresponds to an IP Gateway computer that may authorize or validate transactions). It should be appreciated that these are just a few examples of the types of information that may be provided to the mobile device (and potential uses of that information).

An example of a process that includes the method as described above is provided below for illustration purposes.

A consumer may use his mobile device (e.g. a mobile phone) to interact with a portable consumer device (e.g. a payment card such as a credit card, debit card, etc.) via a contactless interface (e.g. near filed communication) or a physical interface (e.g. swipe). The mobile device may then generate a request for information based on this interaction, which is then sent to a server computer (e.g. at a payment processing network). The request may, but need not, include information received from the portable consumer device such as an account number, a security code, expiration data, consumer name, account number, etc. Some or all of this information could also be stored on the mobile device (such as in a mobile application) rather than being received from the portable consumer device. The request from the mobile device may be sent by any suitable communication channel to the server computer, such as via a wireless network, data network, or wireless LAN network. The server computer may receive the request from the mobile device and provide the first information to the mobile device via the same channel or a different communication channel.

After receiving the first information from the server computer, the mobile device may then interact with an access device located at a merchant. This interaction could comprise a physical interaction, but preferably comprises a short range wireless communication (such as near filed communication, IR, Bluetooth®, etc). The first information may then be sent by (i.e. passed from) the mobile phone to the access device based on this interaction (and preferably though the same communication channel as the interaction). In this manner, the first information that was sent to the mobile device from the server computer based on an interaction between the mobile device and the portable consumer device may then be sent (i.e. passed) to the merchant. The merchant may then include the first information in an authentication request message, or may otherwise use the information to complete the transaction (such as by using the first information to approve the first transaction, identify a location or entity to send an authorization request to, or to authenticate the consumer or the first transaction).

In some instances, to complete the first transaction, the consumer may, but need not, present the portable consumer device to the merchant (either before or after the first information is sent to the merchant by the mobile device). That is, for example, the consumer may still present the portable consumer device to the merchant to pay for the first transaction, and the first information may then be used as further verification of the authenticity of the transaction (or for any other suitable purpose). However, in some embodiments, the consumer need only present the mobile device to the merchant to complete the transaction (i.e. to provide sufficient information to pay for the transaction). The first information (which is sent from the mobile device to merchant) could thereby be sufficient to complete the first transaction, or could be used to supplement payment information stored on the mobile device.

In some embodiments, the server computer could perform one or more validation tests on the first request that is sent by the mobile device, but this is not required. For instance, the mobile device may have a secured application or hardware component that insures that the request is authenticated and therefore the server computer need not perform additional validations tests on the request. The server computer may also store the first information that is sent to the mobile device for later authentication of the first transaction (e.g. to approve an authentication request received by the merchant regarding a first transaction involving the portable consumer device).

I. Exemplary Systems

A system according to an embodiment of the invention is shown in FIG. 1. The system 20 may include a plurality of merchants, access devices, portable devices, acquirers, and issuers. For example, the system 20 may include a merchant computer 22 associated with a merchant, an acquirer computer 24 associated with an acquirer, and an issuer computer 28 associated with an issuer. A payment processing network 26 may be disposed between the acquirer computer 24 and the issuer computer 28. Further, the merchant computer 22, the acquirer computer 24, the payment processing network 26, and the issuer computer 28 may all be in operative communication with each other. The merchant computer 22 may be coupled to an access device (such that information may be received by the access device and communicated to the merchant computer) or, in some embodiments, the access device may comprise a component of the merchant computer 22.

A mobile device 36 may communicate with the merchant computer 22 via short-range communications 72 (such as, for instance, a contactless interface) with an access device. A verification token 34 may be associated with the mobile device 36 that is used by a user 30. The verification token 34 may enable the mobile device 36 to form a first secure communications channel 38 (an example of a first channel) to an Internet Protocol Gateway (IPG) 27, which may be in operative communication with the payment processing network 26. Although the IPG 27 is shown as being a separate entity in FIG. 1, the IPG 27 could be incorporated into the payment processing network 26, or could be omitted. In the latter situation, the first secure communications channel 38 could directly connect the payment processing network 26 and the mobile device 36. In addition, the verification token 34 is shown as connected with to the portable consumer device 32 and mobile device 36 by dotted lines in FIG. 1 so as to indicate that some embodiments may not include a verification token 34 and/or the verification token 34 may be included within the mobile device 36.

The mobile device 36 may be in any suitable form, such as those described above. In some embodiments, the mobile device 36 may comprise a processor, and a computer readable medium coupled to the processor. The computer readable medium may comprise code, executable by the processor, for implementing a method comprising: receiving identification information from a portable consumer device 32 that interacts with the mobile device 36 (and/or verification token 34), wherein the portable consumer device 32 may comprise, for example, a chip storing the account information; establishing a secure communications channel with a remote server computer (e.g. IPG 27 and/or payment processing network 26); and sending the account information associated with the portable consumer device 32 (along with information associated with the mobile device 36) to the server computer as part of a request for a device verification value, where the server computer thereafter may validate the request for a device verification value (and/or may validate the mobile device 36, verification token 34, and/or portable consumer device 32). In some embodiments, some or all of the steps described above may also be performed by the verification token 34, which as noted above may be incorporated into, or coupled to, the mobile device 36 (and thereby as used herein, may be considered as a part of the mobile device 36). The mobile device 36 may also be programmed or configured to interact with an access device coupled to a merchant computer 22, and thereby send the received device verification value to the merchant computer 22 via the access device.

The payment processing network 26 may reside between the acquirer computer 24 and an issuer computer 28. The path that includes the merchant computer 22, the acquirer computer 24, and the payment processing network 26, may form at least part of a second communications channel.

As used herein, an "issuer" is typically a business entity (e.g., a bank) that maintains financial accounts for the user 30 and often issues a portable consumer device 32 such as a credit or debit card to the user 30. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers.

The portable consumer device 32 may be in any suitable form. In some embodiments, portable consumer devices are transportable by nature. As was noted above, suitable portable devices can be hand-held and compact so that they can fit into a consumer's wallet and/or pocket (e.g., pocket-sized). They may include smart cards, keychain devices (such as the Speedpass™ commercially available from Exxon-Mobil Corp.), etc. Other examples of portable devices include cellular phones, personal digital assistants (PDAs), pagers, payment cards, security cards, access cards, smart media, transponders, and the like. The portable devices can also be debit devices (e.g., a debit card), credit devices (e.g., a credit card), or stored value devices (e.g., a stored value card).

The payment processing network 26 may include data processing subsystems, networks, and operations used to support and deliver authorization services, exception file services, and clearing and settlement services. For example, the payment processing network 26 may comprise a server computer, coupled to a network interface, and a database of information. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 26 may use any suitable wired or wireless network, including the Internet.

Although many of the data processing functions and features of some embodiments may be present in the payment processing network 26 (and a server computer therein), it should be understood that such functions and features could be present in other components such as the issuer computer 28, and need not be present in the payment processing network 26, or server computer therein.

Figure 2:
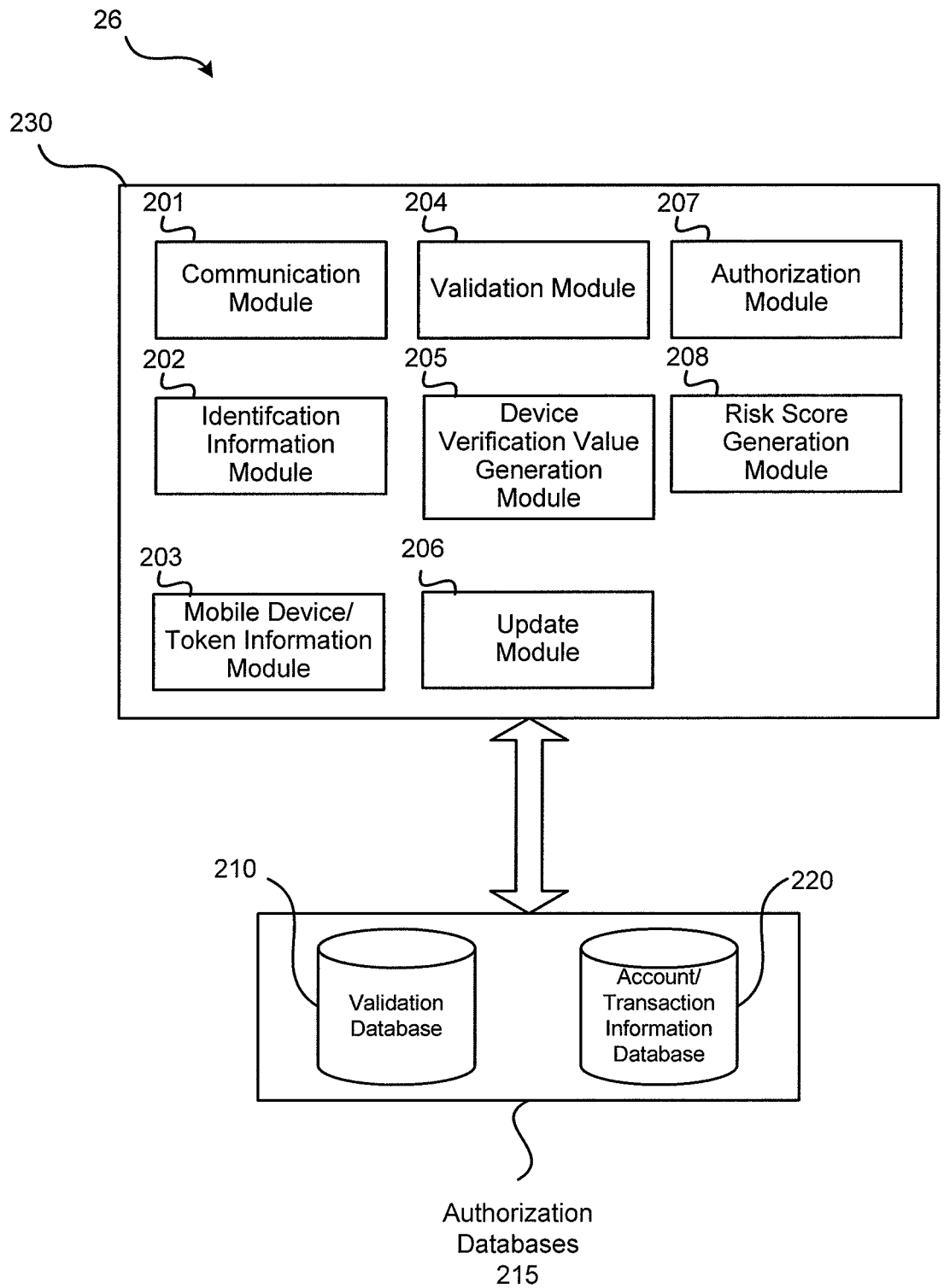
FIG. 2 shows a block diagram of an exemplary system comprising a server computer in accordance with some embodiments.

With reference to FIG. 2, an exemplary server computer 230 in payment processing network 26 is shown. It should be noted that for illustration purposes, many components related to various functionality were included in the exemplary server computer 230 in payment processing network 26. However, in some embodiments, one or more of these functions may be located at a different entity within the system 20, and/or one or more components may be disposed within one or more computers and/or database.

FIG. 2 provides a more detailed illustration of an exemplary embodiment of a system for implementing some of the functionality for validating a request for a device verification value and/or authorizing a transaction associated with the request for the device verification value. Specifically, an exemplary server computer 230 that may perform functions in accordance with aspects described above is provided. This exemplary server computer 230 may, for example through the use of software instructions and/or hardware configurations, perform some of the relevant functions and steps described at least with reference to FIGS. 3 and 5. It should be noted that although FIG. 2 illustrates all of the modules located on a single device, the disclosure is not meant to be so limited. A system for implementing functionality related to, for example, validating a request for a device verification value received from a mobile device (and/or authorizing a financial transaction associated with the device verification value) may have additional components or less then all of these components. Additionally, some modules could be located on other devices such as a remote server or other local devices that are functionally connected to the server computer component(s).

The communication module 201 may be configured or programmed to receive and transmit information through the network to any of the entities shown in FIG. 1. The received information may comprise, for instance, identification information, mobile device information (and/or verification token information, etc.) and/or any other information that the payment processing network 26 may utilize in determining whether a request for a device verification value is valid. In some embodiments, the received information may also comprise whether an authorization entity (e.g. an issuer or merchant) approved or declined a transaction involving a mobile device 36 and/or portable consumer device 32. The communication module 201 may transmit any received information to an appropriate module, including the identification information module 202, mobile device/token information module 203, validation module 204, device verification value generation module 205, update module 206, authorization module 207, and/or risk score generation module 208.

The communication module 201 may also be configured or programmed to receive from the authorization module 207 and/or the risk score generation module 208 an authorization response message or a risk score associated with a transaction, respectively, and to transmit the authorization response message or the risk score to an appropriate entity. In some embodiments, the received and transmitted information may be in the form of an authorization request message or authorization response message. In some embodiments, the communication module 201 may also request information that may be stored at the payment processing network 26 and/or an issuer computer 28. Such information may comprise, for instance, information associated with an account, a portable consumer device 32, or a mobile device 36 (and/or verification token 34) used in the transaction (such as PANs, CVVs, past transaction information, etc). This information may then be utilized by the authorization module 207 and or risk score generation module 208 in determining whether to authorize a transaction and/or generate the risk score associated with the transaction.

The identification information module 202 may be programmed or configured to perform some or all of the functions associated with utilizing the identification information received in a request for a device verification value. For instance, the identification information module 202 may be programmed or configured to identify the identification information in the request and to send this information to the validation module 204. The identification information module 202 may also send data related to the identification information to the update module 206, which may then update the validation database 210 with this information. In some embodiments, the identification information module 202 may also receive from the validation database 210 additional information associated with the received identification information, including, for instance, whether such information has been associated with fraudulent transactions in the past. The identification information module 202 may then send this information to the validation module 204 for use in validating the request.

The mobile device/token information module 203 may be programmed or configured to perform some or all of the functions associated with utilizing the mobile device (and/or verification token) information received in a request for a device verification value. For instance, the mobile device/token information module 203 may be programmed or configured to identify the mobile device (and/or token) information in the request (which may include, for instance, serial numbers, mobile account information, etc.) and to send this information to the validation module 204. The mobile device/token information module 203 may also send data related to the mobile device (and/or verification token) to the update module 206, which may then update the validation database 210 with this information. In some embodiments, the mobile device/token information module 203 may also receive from the validation database 210 additional information associated with the received mobile device information, including, for instance, whether such information has been associated with fraudulent transactions in the past. The mobile device/token information module 203 may then send this information to the validation module 204 for use in validating the request.

The validation module 204 may be configured or programmed to perform some or all the functions associated with utilizing the received identification information and/or mobile device information to validate the request for a dynamic verification value. This may include receiving appropriate information from the communication module 201, identification information module 202, and mobile device/token information module 203 and performing one or more validation tests using this information. Exemplary validation tests and methods for validating a request for a device verification value, as noted above, are described in detail in U.S. patent application Ser. No. 12/780,657 to Hammad entitled "Verification of Portable Consumer Devices," which is hereby incorporated by reference in its entirety. In this regard, the validation module 204 may also communicate with one or more databases (including validation database 210) to retrieve information stored therein to perform any of the validation tests, as required. For example, information about previous fraudulent activity that may be associated with a mobile device 36 or a portable consumer device 32 may be used in determining whether to validate the received request for a device verification value. In some embodiments, this information may be received from the identification information 202 and/or mobile device/token information 203 modules.

In addition, the validation module 204 may also utilize the received identification information and mobile device information in a comparison with similar information stored in validation database 210. That is, for instance, in some embodiments, a consumer may register a portable consumer device 32 with a mobile device 36 in advance (e.g. the mobile device 36 may be associated with a portable consumer device 32 or a payment account), such that when the two devices are used together, the validation entity (in this exemplary embodiment, the payment processing network 26) may have further assurance that the request is valid. However, embodiments are not so limited, and any suitable validation test may be used.

The device verification value generation module 205 may be configured or programmed to perform some or all the functions associated with generating a device verification value, provided that the received request is validated by the validation module 204. For example, the device verification value generation module 205 may be programmed or configured to receive an indication from the validation module 204 that the request has been validated, and may then use any suitable process for generating a variable datum or other data that may be used as a device verification value (e.g. a dCVV2 value). The device verification value generation module 205 may also send the device verification value to the communications module 201 to be included in a response message to the mobile device 36. Moreover, the device verification value generation module 205 may also provide the device verification value to a database (e.g. located at payment processing network 26 or at another entity) to be stored for later comparison with a received authorization request message and/or may send the generated device verification value to the communications module 201, which may then send this value to another authorization entity (e.g. a merchant or an issuer).

The update module 206 may be programmed of configured to maintain and update the authorization databases 215. In this regard, the update module 206 may receive information about a past transaction or request for a device verification value from some or all of the other modules discussed herein. Moreover, the update module 206 may receive information from other sources, such as directly from the payment processing network 26 and/or the IP Gateway 27 (such as, for example, a generated device verification value for a mobile device 36 (and/or a verification token 34) and/or a portable consumer device 32). By maintaining information about past transactions and verification requests, it may be possible in some embodiments to more accurately validate future requests for verification, authorization, and/or to generate risk scores for future transactions.

The authorization module 207 may be configured or programmed to perform some or all the functions associated with authorizing a financial transaction associated with an authorization request message. The authorization request message may be generated by a merchant and may be associated with a transaction involving the portable consumer device 32. The authorization request message may include a device verification value that may have been form filled or otherwise inserted into the authorization request message by the merchant in response to an interaction with the mobile device 36 (e.g. via an access device at the merchant). The authorization module 207 may be programmed or configured to compare the received device verification value with a stored device verification value that was generated and stored by the device verification value generation module 205. In some embodiments, if the two values match, the authorization module 207 may have further assurance that the transaction is valid and may generate an authorization response message authorizing the transaction (or may be more likely to authorize the transaction). The authorization module 207 may also be programmed or configured to execute any further operations associated with a typical authorization and clearing process. This may include retrieving information from one or more databases, including account/transaction information database 220.

In some embodiments, some of the functions described above with regard to the authorization module 207 may be located at one or more of the other entities in the system 20. For instance, in some embodiments, the merchant may request from the payment processing network 26 (or the validation entity) the value of the stored device verification value. The merchant computer 22 may then compare the device verification value received from the mobile device 36 (e.g. via an interaction with an access device) with the device verification value received from the validation entity. Based at least in part on this comparison, the merchant computer (or other entity such as an issuer) may approve or decline the transaction.

The risk score generation module 208 may be configured or programmed to perform some or all the functions associated with generating a risk score associated with a financial transaction that may be used by the payment processing network 26 (e.g. by the authorization module 207) or any other authorization entity in the system 20 to authorize a transaction. Some exemplary processes that may utilize a device verification value (e.g. a dCVV2 value) or other information in generating a risk score are described in detail in U.S. patent application Ser. No. 13/184,080 to Hammad entitled "Token Validation for Advanced Authorization," which is hereby incorporated by reference in its entirety.

The validation database 210 may comprise information received and stored about a mobile device 36 (e.g. verification token information, serial numbers, mobile account information, etc), portable consumer device 32 (or payment account), associations between mobile devices 36 and portable consumer devices 32 (e.g. advanced registration or past transactions), validation of a request for a device verification value (or failure), and any other suitable information that may be used to validate a request. Such information may include, for instance, mobile device 36 (and/or verification token) serial numbers that have been identified as fraudulent or have been used successfully in previous transactions (that is, transactions that were approved by an appropriate authority and/or were not later found to be fraudulent), IP addresses or mobile account information associated with a mobile device 36 known to be fraudulent (or not fraudulent), etc. The validation database 210 may also comprise generated dynamic verification values from previously validated requests for verification values. This information may be used by the validation module 204 to validate the mobile device 36 and/or portable consumer device 32.

The account/transaction information database 220 may be programmed or configured to comprise information associated with payment accounts and past transactions. The information may be used to authorize a transaction and/or generate a risk score for a current transaction. Such information may include previous transaction information (such as volume, amount, merchant identifiers, etc.) as well as information as to whether the account has been used in fraudulent transactions in the past (e.g. a listing of account numbers used in prior fraudulent transactions, IP addresses used, etc.).

Figure 6:
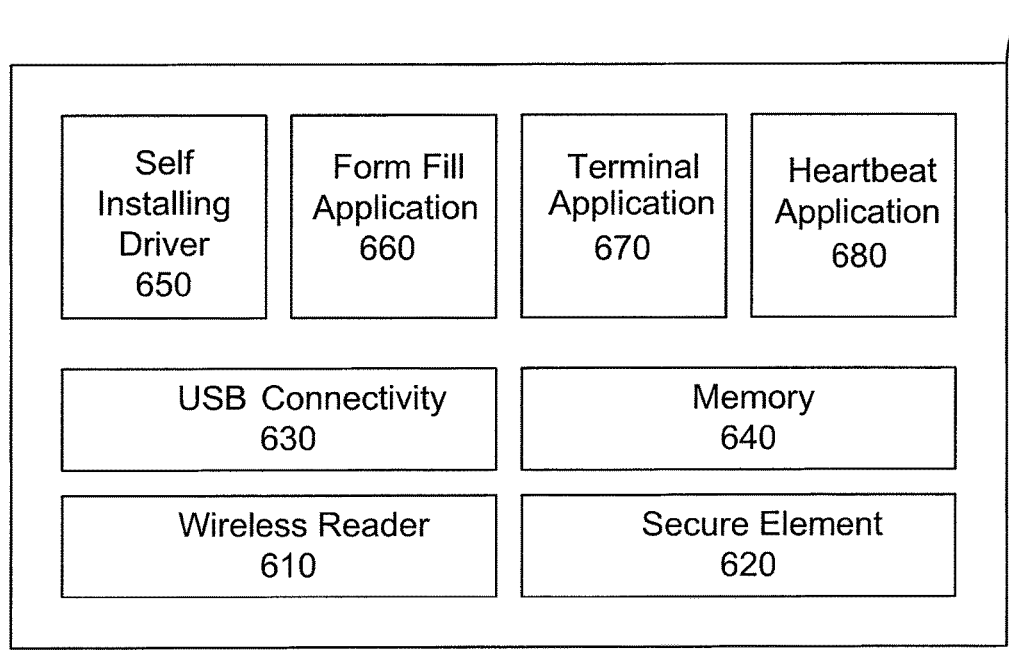
FIG. 6 shows a block diagram of some of the components that may comprise a verification token of a mobile device in accordance with some embodiments.
Figure 8A:
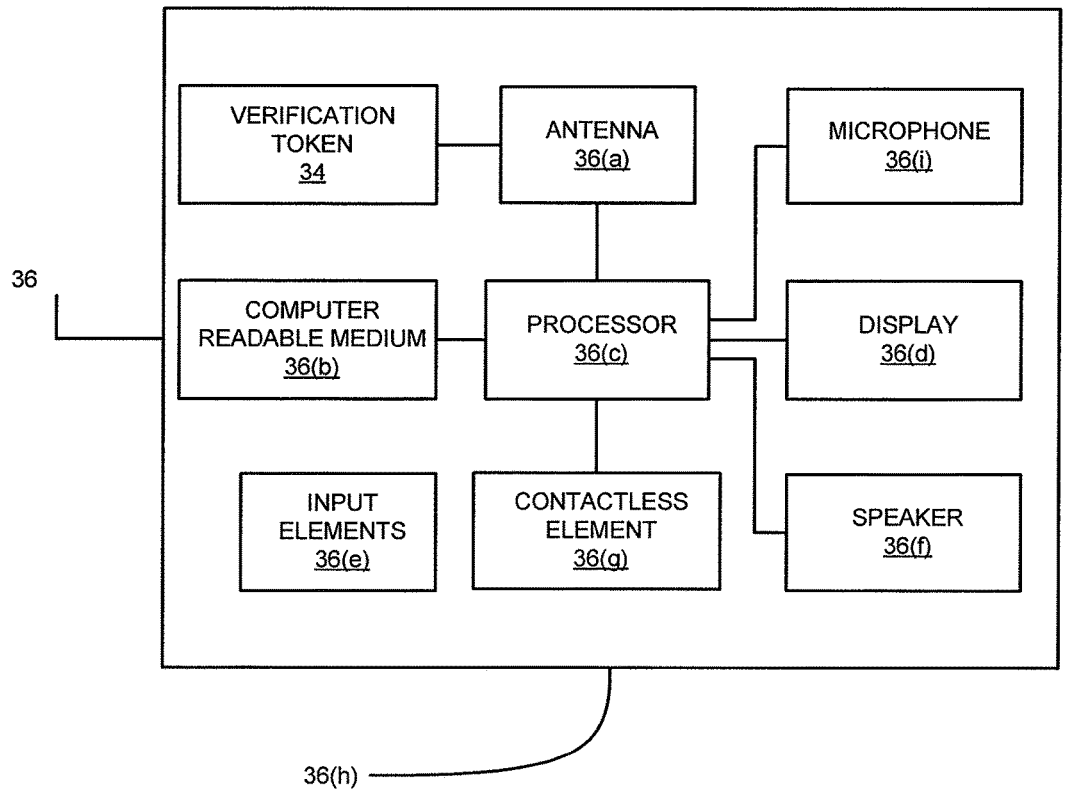
FIG. 8(a) shows a block diagram of some of the functional components that may comprise an exemplary mobile device in accordance with some embodiments.

Reference will now be made to FIGS. 6 and 8(a) for a description of some of the components of an exemplary mobile device 36 and/or an exemplary verification token 34 (as a module and as a separate component). In some embodiments where the verification token 34 may comprise a separate component to the mobile device 36, the user 30 may connect the verification token 34 to an input of his mobile device 36. The mobile device 36 can power the verification token 34 in some embodiments. Once the verification token 34 is connected to the mobile device 36, the mobile device 36 may recognize the presence of the verification token 34 as a valid device, and the verification token 34 may self-install. The verification token 34 may check the mobile device 36 to determine connectivity to a network (e.g. via the Internet or mobile network, etc.).

In some embodiments, a verification token 34 may be part of the mobile device 36 (e.g. it may be a software module or an internal hardware and/or software module). This is illustrated in the exemplary embodiment shown in FIG. 8, where verification token 34 is illustrated as a module within the mobile device 36. Indeed, this may be preferred in some embodiments because the verification token 34 (or the functionality associated with the verification token 34) could be remotely downloaded to the mobile device 36 or preinstalled in the device. The component of the mobile device 36 that comprises the verification token 34 may utilize some of the other features shown with respect to the mobile device 36 in FIG. 8 (e.g. contactless element 36(g), microprocessor 36(c), antenna 36(a), etc.) as needed, or may comprise its own separate components. As described above, a verification token 32 (whether an internal, integrated component or external, separable component) may be considered a part of the mobile device 36. In some embodiments, the mobile device may not comprise a secured element such as verification token 34, but may provide similar functionality in performing the methods described below and with reference to FIGS. 3 and 4. Note that the remaining components that may comprise an exemplary mobile device 36 will be described in more detail below with further reference to FIG. 8.

If network connectivity is available (e.g. the Internet, a mobile network, etc.), in some embodiments the verification token 34 may automatically attempt to establish a background SSL session to the IPG 27 (or payment processing network 26) so that it can be used as a part of a validation process. In some embodiments, the session may not be established until a user 30 requests a connection to be established.

FIG. 6 shows some components that may be present in a verification token 34 within, or coupled to, a mobile device 36 in some embodiments. For example, the verification token 34 may include an application, such as the self-installing driver 650, so that the verification token 34 may install itself automatically after the verification token 34 is inserted into and recognized by the mobile device 36 (e.g. when the verification token 34 may comprise an external component). The verification token application may be able to connect to a backend host, perhaps at a predefined IP address, using a background secure SSL browser session. A terminal application 670 and heartbeat application 680 may be used to establish and maintain this browser session. If the session connection is successfully established, the verification token 34 may identify itself (and/or the mobile device 36) to the IPG 27 by providing its unique token serial number, IP address, mobile device account number, mobile device serial number, etc. to the IPG 27. Other information may also be passed (e.g., password, encryption keys, etc.) to the IPG 27 at this point.

The exemplary embodiment of the verification token 34 illustrated in FIG. 6 may comprise a separate component that may connect to the mobile device 36 using connectivity module 630. The verification token 34 (whether internal to the mobile device or coupled thereto) may also comprise a secure element 620 (e.g., a chip such as a smart card chip, which has sufficient data and security protocols and hardware), a wireless/contactless reader 610 capable of reading identification information from a portable consumer device (or a module for using a contactless interface of the mobile device 36), built in memory 640, a self-installing driver 650, a form fill application 660, a terminal application 670, and a heartbeat application 680. The verification token 34 may also have other features such as a keyboard buffer capability and a unique serial number associated with the verification token 34. However, embodiments are not so limited.

Although FIG. 6 includes features and components of a verification token 34 that may be related to embodiments where the verification token 34 is an external component that is coupled to the mobile device 36, as noted above, this exemplary embodiment was provided for illustration purposes only. The verification token 34 may comprise many other suitable forms. For example, as described above, the verification token 34 may comprise hardware (or software) or other module installed in the mobile device 36.

II. Exemplary Methods

Methods according to some embodiments are described below with reference to FIGS. 3 and 4, and with further reference to the system elements in FIGS. 1 and 2. The methods described below are exemplary in nature, and are not intended to be limiting. Methods in accordance with some embodiments described herein may include (or omit) some or all of the steps described below, and may include steps in a different order than described herein.

Referring to FIGS. 1 and 3, prior to establishing the first communication channel 38, in some embodiments, a user 30 may receive hardware and/or software (which may include, for example, a verification token 34) for his mobile device 36 from his or her financial institution or another entity. As described above, this hardware and/or software may comprise an internal component of the mobile device 36 or may comprise an external component that is coupled to the mobile device 36 (e.g. either physically or operatively coupled through a communication mechanism such as short range communication interface). The hardware and/or software may also be secured (e.g. tamper proof) such as when comprising a verification token 34.

Figure 3A:
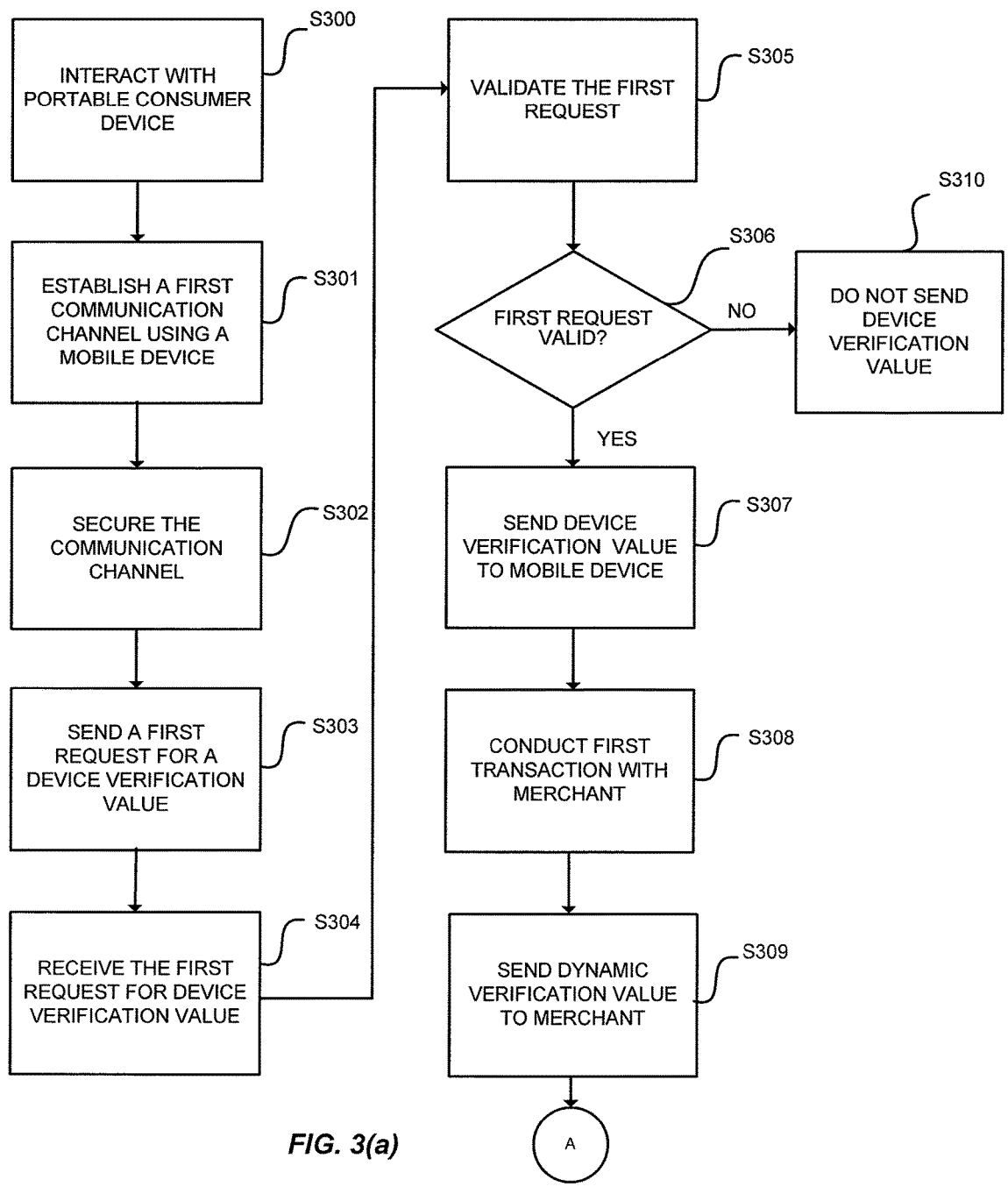
FIGS. 3(a) and 3(b) show flowcharts illustrating exemplary methods of conducting a financial transaction in accordance with some embodiments.
Figure 3B:
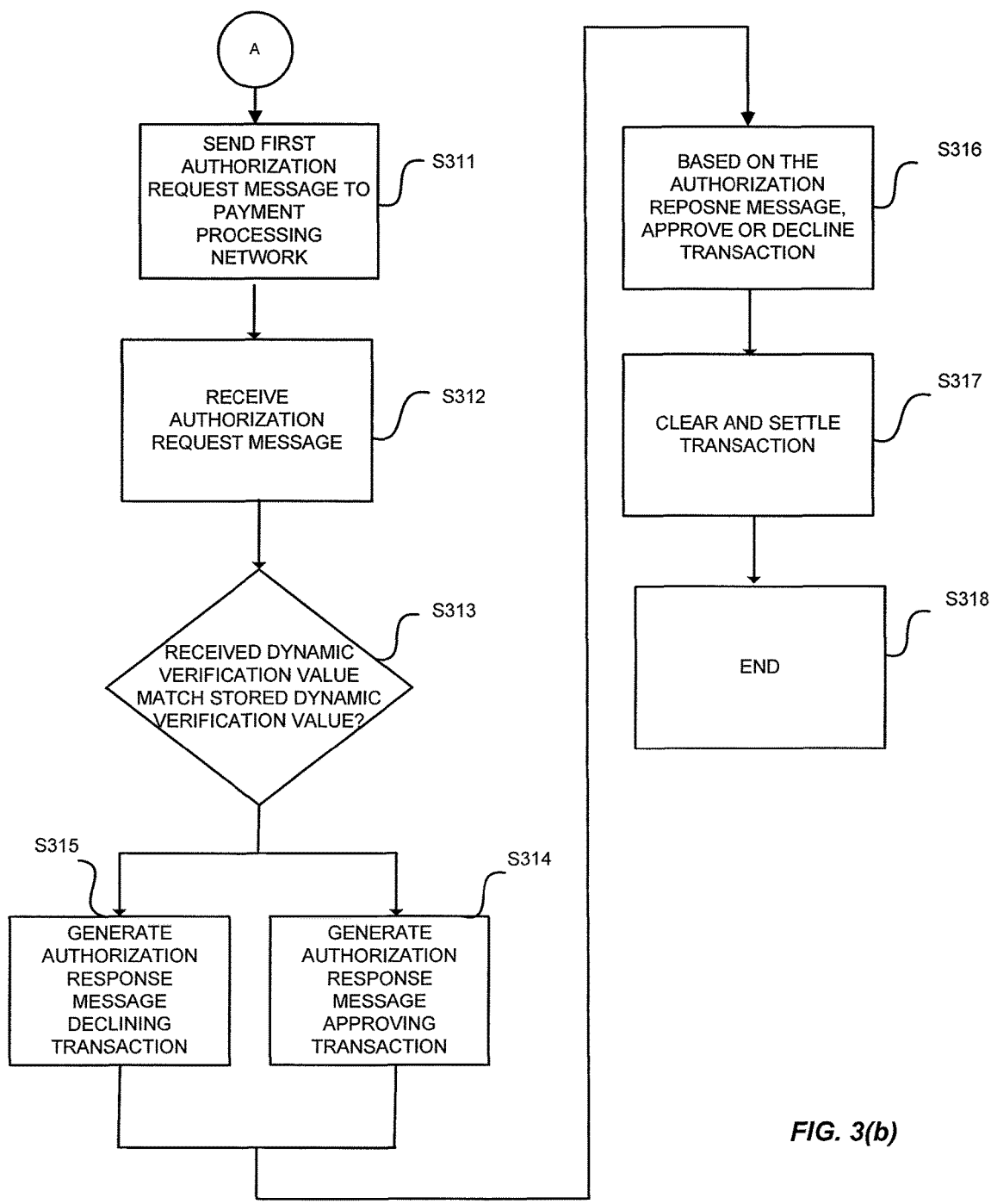

Reference will now be made to the exemplary method shown in FIGS. 3(a) and 3(b). Again, this is an exemplary embodiment that is described for illustration purposes only.

At step S300, a user 30 conducting a transaction may generate a request for a dynamic verification value (e.g. dCVV2 or similar information that may be used to validate a transaction) from the payment processing network 26. The request may be made via a portable consumer device 32 (such as a credit card or Visa payWave card) interacting with a mobile device 36 (e.g., that may comprise a verification token 34). In some embodiments, the portable consumer device 32 may include a chip comprising chip-card type data such as a dynamic counter, dynamic verification value, PAN, cryptogram, etc. As noted above, the mobile device 36 may also include a contactless interface to receive data from the chip in the portable consumer device 32. In other embodiments, the portable consumer device 32 may interact with the mobile device 36 using a contact mode of operation. For example, the mobile device 36 may have a magnetic card reader, and the portable consumer device 32 may be a payment card with a magnetic stripe, which can be read by the card reader. However, as described above, embodiments are not so limited and the request for the dynamic verification value may be generated by the mobile device using any suitable information (which may or may not include portable consumer device information) and may be generated or initiated at any suitable time (e.g. a consumer could initiate the request using a preregistered username and password, etc.).

In some embodiments, prior to sending the request, the user 30 may set up an account with the payment processing network 26. That is, for instance, a user 30 may establish an association between a mobile device 36 (and/or verification token 34) and a portable consumer device 32 prior to requesting a device verification value. In this manner, the payment processing network 26 may anticipate receiving the request from the user 30 and can appropriately process the request. In some embodiments, the user 30 may, in addition to or in lieu of requesting a dCVV2, the mobile device 36 may make a request for a PAN, dPAN, cryptogram, counter or the like to the payment processing network 26.

In step S301, the mobile device 36 may establish a first communication channel with the payment processing network 26 (or other validation entity). The communication channel may use any suitable network, including the Internet and/or a private network, and may also utilize any suitable connection method, including use of a mobile network, data network, etc. At step S302, the communication channel may be secured in any suitable manner, including an encrypted SSL session. The mobile device 36 (e.g. through use of a verification token 34) may send to the IPG 27 information associated with the mobile device 36 (e.g. serial numbers of components, etc.), an encrypted message (e.g. using a unique encryption key), and/or information related to the portable consumer device 32 (e.g. account number, verification values, user information, etc.). This may enable the mobile device 36 to form a secure communications channel 38 with the IPG 27 (or any other validation entity).

At step S303, the mobile device 36 may generate and send a first request for a device verification value to the payment processing network 26, IGP 27, or other validation entity. In some embodiments, the mobile device 36 may send any information (whether encrypted or otherwise) that may be used to validate the request for a device verification value, as was described above. At step S304, the request may be received by the validation entity, which may include server computer 210 at the payment processing network 26.

At step S304, the first request for the device verification value (and accordingly, the mobile device 36 and/or portable consumer device 32) may be validated utilizing the information sent in step S303. This may be done in any suitable manner, including those described in detail above. In some embodiments, the validation may involve the IPG 27 communicating with the payment processing network 26. That is, in some embodiments, the payment processing network 26 may comprise information that is used to validate the first request (and/or mobile device 36, including in some embodiments a verification token 34). This could, for example and as described in detail above, comprise a database of information associated with the mobile device 36 (e.g. serial numbers and corresponding encryption keys, IP addresses, etc.). In addition, when the mobile device 36 is connected to the IPG 27 and the payment processing network 26, a number of different processes may be performed. For example, in some embodiments, the payment processing network 26 may receive data from the portable consumer device 32 such as PANs, cryptograms, counters, dynamic verification values, etc. This information may be stored in the payment processing network 26 for use in generating a risk score associated with a later transaction and/or validating a mobile device 36 in a future request from the user 30.

At step S305, it may be determined if the first request is valid. As noted above, this may comprise any suitable validation method, which may include the use of any information that the validation entity received regarding the first transaction and/or regarding past transactions. In some embodiments, if at step S306 the first request is not valid, then at step S310 the validation entity does not send a device verification value. In addition, in some embodiments, the information associated with the first request may be stored at the validation entity (e.g. server computer 210) for use in validating future requests. That is, for instance, if a mobile device 36 was used with one portable consumer device 32 and the request was not validated, and later the same mobile device 36 is used with a different portable consumer device 32', then it may be evidence of fraudulent activity. If the first request is validated, then the exemplary method may proceed to step S307.

At step S307, in some embodiments if the first request is validated, the user 30 via the mobile device 36 may receive a message from the payment processing network 26 via the secure communications channel 38 and the IPG 27 that includes a device verification value (e.g. dCVV2 and/or similar information that may be used in a subsequent transaction by the user 30). In some embodiments, the message may be sent back through the same channel that the request was sent in, or a different channel, such as an email, text message, or through a web interface. In some embodiments, the information may also be stored in mobile device 36 and the user 30 may (or may not) have access to this information. In such embodiments, as explained below, the mobile device 36 may be used to submit (e.g. send or transmit) the device verification value to a merchant (e.g. via an access device) to perform a transaction, as was described above. The device verification value may also be stored at the payment processing network 26 (or another validation entity) for later use to authorize a financial transaction associated with the portable consumer device 32.

At step S308, the user 30 conducts a transaction with a merchant and may choose to pay for that transaction using the portable consumer device 32 (such as a Visa payWave card). That is, for instance, the user 30 may select a good to purchase at a merchant's store. The merchant may enter the information regarding the transaction (e.g. type of good, price, etc.) and request payment from the user 30. The user 30 may then designate payment using a payment account that may be associated with the portable consumer device 32 by presenting the portable consumer device 32 to the merchant. The merchant may then enter this information into the merchant computer 22 (e.g. via an access device such as a POS terminal). The user 30 may then be prompted to enter in (or otherwise provide) the first device verification value associated with the portable consumer device 32.

At step S309, the first dynamic verification value may be sent (or otherwise provided) to the merchant. That is, the user 30 may provide the received device verification value (e.g. the dCVV2 value) received in step S304 to the merchant (and/or merchant computer 22). In some embodiments, the mobile device 36 may automatically send the device verification value to the merchant (e.g. merchant access device via a POS terminal) using a short range communication. That is, for instance, when the user 30 is prompted in step S308 to provide the device verification value associated with the portable consumer device 32, the user may present the mobile device 36 so that it interacts with the merchant's access device and sends the device verification value. In this manner, neither the user nor the merchant may need access to the device verification value, which may increase the security of some embodiments. Indeed, by directly passing the device verification value from the mobile device 36 to the merchant, embodiments may provide less opportunity for a third party to intercept (or somehow replicate) the device verification value and attempt to conduct a fraudulent transaction. Moreover, by utilizing an interaction between the merchant's access device and the mobile device 36 to send the device verification value, embodiments may provide a fast and efficient manner of providing added security to a transaction (rather than, for instance, requiring the user or merchant to manually enter the information, although embodiments are not so limited). The use of short range communications may also enable mobile devices of different sizes, shapes, etc. to readily interact with the merchant's access device in some embodiments.

At step S311, a first authorization request message corresponding to the first transaction may be generated (e.g., by an access device at the merchant) and sent to the payment processing network 26. The first authorization request message may comprise, for instance, transaction related information (e.g. information such as a merchant identifier, transaction amount, transaction velocity, etc.), account information (e.g. account number, expiration date, card verification value, etc.), and the received device verification value (e.g. a dCVV2 value). In some embodiments, the first authorization request message generated by the merchant may be form filled with the device verification value received from the user 30 (e.g. from the interaction with the mobile device 36) and/or any other transaction related information. That is, the merchant computer 22 may automatically enter the device verification value into a designated field in the authorization request message, which may then be sent to the payment processing network 26.

At step S312, the authorization request message may be received by the payment processing network 26 (e.g. by the communications module 201). At step S313 the payment processing network 26 may then compare the dynamic verification value received in step S312 as part of the authorization request message with the dynamic verification value that was previously received and stored in step S307 as part of the validation of the first request for the device verification value. If it is determined that the two device verification values match, then at step S314, an authorization response message may be generated by the payment processing network 26 approving of the first transaction. If the two device verification values are determined in step S313 not to correspond (i.e. match), then an authorization response message declining the transaction may be generated at step S315. In some embodiments the determination as to whether the two device verification values (e.g. the stored device verification value and the received device verification value included in the authorization request message) correspond may be considered as one factor of a plurality of factors as to whether the transaction is authorized (e.g. it may be included as an input in a calculation of a risk score for the transaction).

At step S316, the merchant may receive the authorization response message generated in steps S314 or S315 and based on this response message, may approve or decline the transaction. At step S317, if the transaction was approved by the payment processing network 26, then the payment processing network 26, issuer, acquirer, and/or merchant may perform the typical clearing and settling of the transaction.

Figure 4:
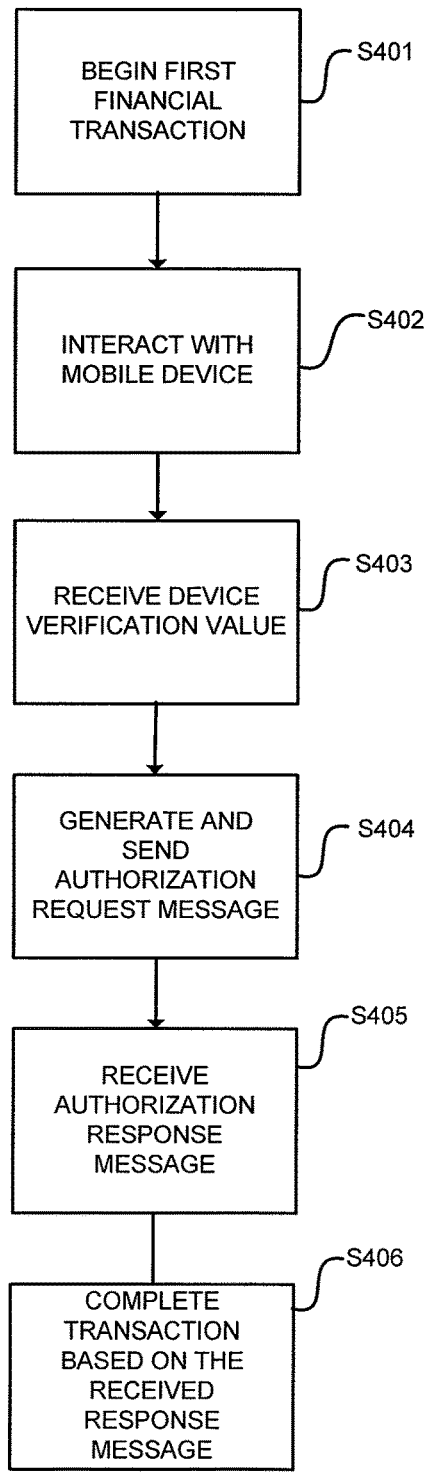
FIG. 4 shows a flowchart illustrating a method for conducting a financial transaction in accordance with some embodiments.

With reference to FIG. 4, another flow chart showing the exemplary steps that may be performed by a merchant according to some aspects of embodiments provided herein is shown. At step S401, a first transaction may begin, for instance, when a user 30 selects one or more items or services to purchase. The merchant may enter in any transaction related data that may be included in an authorization request message. The user 30 may also present a portable consumer device 32 (such as a payment card) to merchant to pay for the transaction. The merchant may interact with the portable consumer device 32 (e.g. through an access device). The merchant and/or the user 30 may then be prompted to enter a device verification value. For instance, in some embodiments, the payment processing network 26 may initially receive an indication from the merchant that the portable consumer device was associated with the first financial transaction (e.g. in a message from the merchant). The payment processing network 26 may determine (e.g. using a look-up database) whether a device verification value is associated with the portable consumer device 32, and, if so, may send a message to the merchant requesting that the device verification value be provided. In some embodiments, the merchant may automatically request that the user 30 provide the device verification value (e.g. prior to a communication with the payment processing network 26), or the user may present the device verification value when completing the first transaction.

At step S402, an access device that may be coupled to the merchant computer 22 may interact with the mobile device 36. That is, for instance, the merchant computer 22 may comprise (and/or be coupled to) an access device that may interact with the mobile device 36. As described above the interaction may comprise short range wireless communication or any other suitable method of transferring data from one device to another (e.g. a physical interaction). At step S403, based on the interaction between the access device that may be coupled to the merchant computer 22 and the mobile device 36, the merchant computer 22 may receive information from the mobile device, including the device verification value.

At step S404, the merchant computer 22 may generate an authorization request message that comprises the received device verification value. For example, in some embodiments, after the device verification value is received from the mobile device 36 in step S403, the merchant computer 22 may form fill this information into a field of an authorization request message (along with any other information). This automatic form fill step may thereby, in some embodiments, make the additional step of including the device verification value more efficient and less burdensome to the merchant. The generated authorization request message may then be electronically sent by the merchant computer 22 to the payment processing network 36.

At step S405, the merchant may receive an authorization response message from the payment processing network 26. The authorization response message may be based, at least in part, on whether the device verification value that was included in the authorization request message sent by the merchant computer 22 matched a previously stored device verification value associated with the device verification value. At step S406, the merchant may approve or decline the transaction based on the received authorization response message, and/or may request additional information from the user 30 to complete to transaction.

As noted above, the method shown in FIG. 4 is provided for illustration purposes and is not intended to be limiting. For instance, in some embodiments, rather than (or in addition to) the merchant computer 22 generating an authorization request message that includes the device verification value, the merchant computer 22 may determine whether the device verification value received from the mobile device 36 matches a stored verification value that was previously associated with the portable consumer device 32. For instance, in some embodiments, the merchant computer 22 may request a stored device verification value from a validation entity (e.g. payment processing network 26), and may then compare the device verification value received form the mobile device 36 with the device verification value received from the validation entity.

In some embodiments, the merchant may determine whether to approve or decline a transaction associated with a payment device 32 based on, for instance, information received from the payment processing network (e.g. when the merchant comprises a merchant processor such as CyberSource®). The information received by the merchant computer 22 from the payment processing network 26 may include, for instance, whether the device verification value provided by the mobile device 36 matches a device verification value previously associated with the portable consumer device 32. In some embodiments, the merchant computer 22 may receive a risk score associated with the transaction that may be based, at least in part, on whether the device verification value provided by the mobile device 36 matches a previously stored device verification value associated with the portable consumer device 32.

Embodiments may provide some advantages. For example, some embodiments may provide for greater security in conducting transactions when a consumer is located at a merchant (i.e. not involved in an e-commerce or remote transaction). That is, for instance, by using a mobile device as part of a system or method to validate the user and/or a portable consumer device prior to conducting a transaction with the merchant, embodiments may provide increased security (and additional information that may be used to authenticate such transactions) that may prevent (or reduce the number of) unauthorized use of a portable consumer device (such as a payment card) even if a nefarious party is in possession of the portable consumer device. As noted above, typically in brick-and-mortar transactions, the merchant does not request additional information from the user that could otherwise be used to authenticate the transaction. By providing an additional validation step of the portable consumer device, embodiments may thereby provide an efficient, cost effective manner to increase the certainty of the authenticity of such transactions. Moreover, in some embodiments, the device verification value may be passed to the merchant by the mobile device without creating a large burden on either the consumer or the merchant (e.g. neither party may need to manually enter the device verification value to complete the transaction). This may increase the likelihood that the consumer and/or the merchant would be willing to use such an authorization system. In addition, by directly passing the device verification value from the mobile phone to the merchant computer, embodiments may increase the security of the system because a nefarious party may not be afforded the opportunity intercept or copy the device verification value before it is provided to the merchant.

III. Exemplary Computer Apparatus, Mobile Device, and Portable Consumer Device

Figure 7:
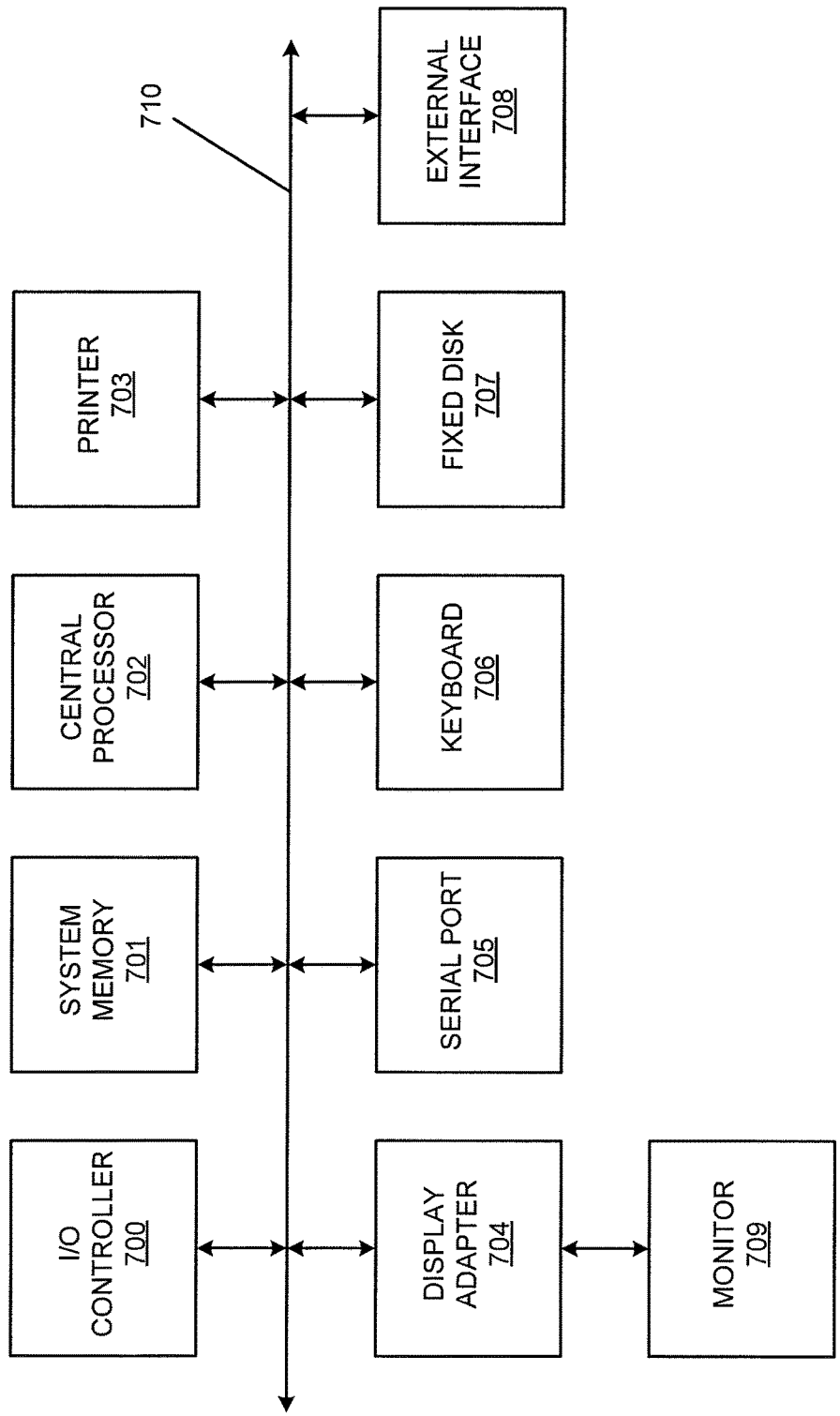
FIG. 7 shows a block diagram of an exemplary computer apparatus.

Referring now to FIG. 7 the various participants and elements in FIGS. 1 and 2 can operate one or more computer apparatuses (e.g., a server computer) to facilitate the functions described herein. Any of the elements in FIGS. 1 and 2 can use any suitable number of subsystems to facilitate the functions described herein. Examples of such subsystems or components are shown in FIG. 7. The subsystems shown in FIG. 7 are interconnected via a system bus 710. Additional subsystems such as a printer 703, keyboard 706, fixed disk 707 (or other memory comprising computer readable media), monitor 709, which is coupled to display adapter 704, and others are shown. Peripherals and input/output (I/O) devices, which coupled to I/O controller 700, can be connected to the computer system by any number of means known in the art, such as serial port 705. For example, serial port 705 or external interface 708 can be used to connect the computer apparatus to a wide area network such as the Internet, a mouse input device, or a scanner. The interconnection via system bus allows the central processor 702 to communicate with each subsystem and to control the execution of instructions from system memory 701 or the fixed disk 707, as well as the exchange of information between subsystems. The system memory 701 and/or the fixed disk 707 can embody a computer readable medium.

FIG. 8(a) shows a block diagram of a mobile device 36 that may be used in some embodiments. The mobile device may be both a notification device that can receive alert messages, a portable consumer device that can be used to make payments, and/or a device that may be used in the systems and method described above related to utilizing a device verification value. The exemplary mobile device 36 may comprise a computer readable medium and a body as shown in FIG. 8(a). The computer readable medium 36(b) may be present within the body 36(h), or may be detachable from it. The body 36(h) may be in the form a plastic substrate, housing, or other structure. The computer readable medium 36(b) may be in the form of (or may be included in) a memory that stores data (e.g., issuer account numbers, loyalty provider account numbers, etc.) and may be in any suitable form including a magnetic stripe, a memory chip, etc. The memory may store information such as financial information, transit information (e.g., as in a subway or train pass), access information (e.g., as in access badges), serial numbers, mobile account information, and any other suitable information that may be used in validating the mobile device 36. Financial information may include information such as bank account information, loyalty account information (e.g., a loyalty account number), a bank identification number (BIN), credit or debit card number information, account balance information, expiration date, consumer information such as name, date of birth, etc. Any of this information may be transmitted by the mobile device 36.

In some embodiments, information in the memory may also be in the form of data tracks that are traditionally associated with credit cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks abide by it. It contains the cardholder's account, encrypted PIN, plus other discretionary data.

The mobile device 36 may further include a contactless element 36(g), which is typically implemented in the form of a semiconductor chip (or other data storage element) with an associated wireless transfer (e.g., data transmission) element, such as an antenna. Contactless element 36(g) is associated with (e.g., embedded within) phone 36 and data or control instructions transmitted via a cellular network may be applied to contactless element 36(g) by means of a contactless element interface (not shown). The contactless element interface functions to permit the exchange of data and/or control instructions between the mobile device circuitry (and hence the cellular network) and an optional contactless element 36(g), or between another device having a contactless element (e.g. a POS terminal or a portable consumer device).

Contactless element 36(g) may be capable of transferring and receiving data using a near field communications ("NFC") capability (or near field communications medium) typically in accordance with a standardized protocol or data transfer mechanism (e.g., ISO 14443/NFC). Near field communications capability may comprise a short-range communications capability, such as RFID, Bluetooth™, infra-red, or other data transfer capability that can be used to exchange data between the mobile device 36 and an interrogation device (or a portable consumer device 32). That is, mobile device 36 may comprise components to both be the interrogator device (e.g. receiving data) and the interrogated device (e.g. sending data). Thus, the mobile device 36 may be capable of communicating and transferring data and/or control instructions via both cellular network (or any other suitable network, such as through the Internet or other data network) and short range communications capability.

The mobile device 36 may also include a processor 36(c) (e.g., a microprocessor) for processing the functions of the phone 36 and a display 36(d) to allow a consumer to see phone numbers and other information and messages. The phone 36 may further include input elements 36(e) to allow a user to input information into the device, a speaker 36(f) to allow the user to hear voice communication, music, etc., and a microphone 36(i) to allow the user to transmit her voice through the mobile device 36. The mobile device 36 may also include an antenna 36(a) for wireless data transfer (e.g., data transmission).

If the portable consumer device is in the form of a debit, credit, or smartcard, the portable consumer device may also optionally have features such as magnetic stripes. Such devices can operate in either a contact or contactless mode.

Figure 8B:
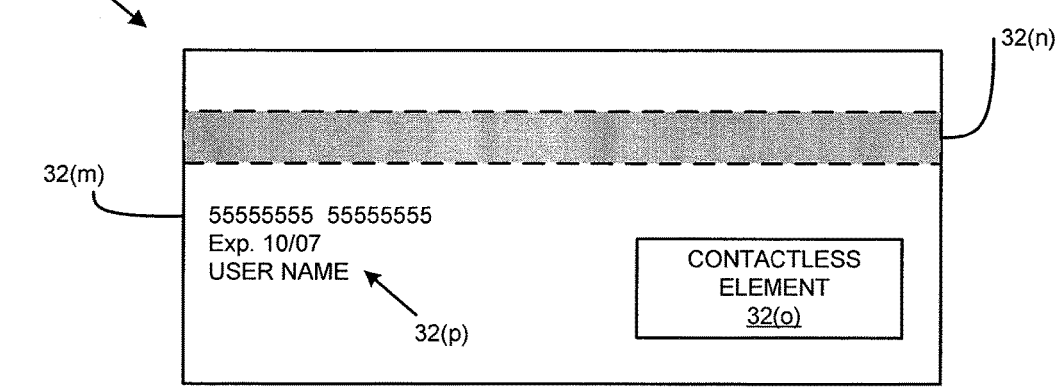
FIG. 8(b) shows a schematic depiction of an exemplary portable consumer device in the form of a payment card.

An example of a portable device 32" in the form of a card is shown in FIG. 8(b). FIG. 8(b) shows a plastic substrate 32(m). A contactless element 32(o) for interfacing with an access device 34 may be present on or embedded within the plastic substrate 32(m). Consumer information 32(p) such as an account number, expiration date, and user name may be printed or embossed on the card. Also, a magnetic stripe 32(n) may also be on the plastic substrate 32(m). The portable device 32" may also comprise a microprocessor and/or memory chips with user data stored in them.

As shown in FIG. 8(b), the portable device 32" may include both a magnetic stripe 32(n) and a contactless element 32(o). In other embodiments, both the magnetic stripe 32(n) and the contactless element 32(o) may be in the portable device 32". In other embodiments, either the magnetic stripe 32(n) or the contactless element 32(o) may be present in the portable device 32".

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment can be combined with one or more features of any other embodiment without departing from the scope of the invention.

A recitation of "a", "an" or "the" is intended to mean "one or more" unless specifically indicated to the contrary

What is claimed is:

1. A method comprising:
receiving, at a server computer, a first request from a mobile device associated with a consumer for a device verification value, the first request including account information associated with a portable consumer device and information associated with the mobile device, wherein the first request is based on an interaction between the mobile device and the portable consumer device, wherein the first request is received at the server computer over a secure communications channel between the server computer and the mobile device;

determining, using the server computer, that the first request for the device verification value is valid;

performing, by the server computer, at least a first validation test pertaining to the first request based on the determination that the first request for the device verification value is valid, wherein the at least first validation test validates the mobile device;

generating, by the server computer, a first device verification value based on the at least first validation test, wherein the first device verification value is a temporary first device verification value that is valid for a first predetermined number of transactions or for a first predetermined amount of time, wherein the temporary first device verification value includes information related to validation of the mobile device;

sending, by the server computer, the first device verification value to the mobile device;

storing, by the server computer, the first device verification value;

receiving, at the server computer, a first authorization request message comprising the first device verification value from a first point of sale terminal for a transaction between the mobile device associated with the consumer and the first point of sale terminal, the first authorization request message including data related to the transaction and the first device verification value, wherein the first device verification value was previously transferred from the mobile device to the first point of sale terminal via an interaction between the mobile device and the first point of sale terminal;

determining, by the server computer, if the first device verification value in the received first authorization request message corresponds to the stored first device verification value;

generating, by the server computer, a first authorization response message based at least in part on the determination if the first device verification value in the first authorization request message corresponds to the stored first device verification value;

sending the first authorization response message to the first point of sale terminal;

after the first device verification value becomes invalid:
receiving, at the server computer, a second request from the mobile device for another device verification value, the second request including the account information associated with the portable consumer device and information associated with the mobile device, wherein the second request is based on another interaction between the mobile device and the portable consumer device, wherein the second request is received at the server computer over the secure communications channel between the server computer and the mobile device;

determining, using the server computer, that the second request for another device verification value is valid;

performing, by the server computer, at least second validation test pertaining to the second request based on the determination that the second request for the another device verification value is valid, wherein the at least second validation test validates the mobile device;

generating, by the server computer, a second device verification value based on the at least second validation test, wherein the second device verification value is a temporary second device verification value that is valid for a second predetermined number of transactions or for a second predetermined amount of time, wherein the temporary second device verification value includes information related to validation of the mobile device;

sending, by the server computer, the second device verification value to the mobile device; and storing, by the server computer, the second device verification value.

2. The method of claim 1, wherein the first authorization response message indicates that the transaction is approved based at least in part on the determination that the first device verification value in the first authorization request message is the same as the stored first device verification value.

3. The method of claim 1, wherein the method further comprises:

sending the first device verification value to the mobile device based on the determination that the at least first validation test is passed.

4. The method of claim 1 wherein the first authorization response message indicates that the transaction is denied based on the determination that the first device verification value in the first authorization request message is not the same as the stored first device verification value.

5. The method of claim 1 wherein the information associated with the mobile device includes SIM card information, application specific information, IP address information, hardware specific information, or serial number.

6. The method of claim 1 wherein the device verification value includes a dynamic card verification value 2 (dCVV2), a dynamic primary account number (dPAN), or a shared secret value.

7. The method of claim 1 wherein the first request for the device verification value includes information associated with the consumer.

8. The method of claim 1, wherein the interaction between the mobile device and the first point of sale terminal comprises short-range wireless communication.

9. The method of claim 1, further comprising:

sending, by the server computer, the first device verification value to the mobile device via a secure communications session.

10. The method of claim 1, further comprising:

registering, by the server computer, the mobile device for a secure communications session, wherein registering establishes a session key; and encrypting, by the server computer, the first device verification value using the session key.

11. The method of claim 10, further comprising:

terminating, by the server computer, the secure communications session upon sending the first device verification value to the mobile device.

12. The method of claim 1, further comprising:

receiving, at the server computer, a second authorization request message comprising the second device verification value from a second point of sale terminal for a transaction between the mobile device associated with the consumer and the second point of sale terminal, the second authorization request message including data related to the transaction and the second device verification value, wherein the second device verification value was previously transferred from the mobile device to the second point of sale terminal via an interaction between the mobile device and the second point of sale terminal;

determining, by the server computer, if the second device verification value in the received second authorization request message corresponds to the stored second device verification value;

generating, by the server computer, a second authorization response message based at least in part on the determination if the second device verification value in the second authorization request message corresponds to the stored second device verification value; and sending the second authorization response message to the second point of sale terminal.

13. The method of claim 1, further comprising:

receiving, at the server computer, a second authorization request message comprising the second device verification value from the first point of sale terminal for a different transaction between the mobile device associated with the consumer and the first point of sale terminal, the second authorization request message including data related to the different transaction and the second device verification value, wherein the second device verification value was previously transferred from the mobile device to the first point of sale terminal via another interaction between the mobile device and the first point of sale terminal;

determining, by the server computer, if the second device verification value in the received second authorization request message corresponds to the stored second device verification value;

generating, by the server computer, a second authorization response message based at least in part on the determination if the second device verification value in the second authorization request message corresponds to the stored second device verification value; and sending the second authorization response message to the first point of sale terminal.

\* \* \* \* \*